United States Patent
Main-Reade et al.

(10) Patent No.: US 11,480,949 B2
(45) Date of Patent: *Oct. 25, 2022

(54) SYSTEMS AND METHODS FOR VIRTUALLY TAGGING AND SECURING INDUSTRIAL EQUIPMENT

(71) Applicant: Rockwell Automation Technologies, Inc., Mayfield Heights, OH (US)

(72) Inventors: David Main-Reade, Kiln Farm (GB); Derek Jones, Sandbach (GB); David A. Vasko, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 716 days.

This patent is subject to a terminal disclaimer.

(21) Appl. No.: 16/359,804

(22) Filed: Mar. 20, 2019

(65) Prior Publication Data

US 2019/0219991 A1    Jul. 18, 2019

Related U.S. Application Data

(63) Continuation of application No. 16/032,941, filed on Jul. 11, 2018, now Pat. No. 10,254,749, which is a
(Continued)

(51) Int. Cl.
*G05B 19/418*    (2006.01)
*G07C 3/00*    (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .... G05B 19/4185; G05B 9/02; G05B 19/042; G05B 19/406; G05B 19/4183;
(Continued)

(56) References Cited

U.S. PATENT DOCUMENTS 6,442,983 B1 *    9/2002    Thomas .............. E05B 47/0012
                                                          70/278.1
7,012,503 B2 *    3/2006    Nielsen .................... G07C 9/27
                                                          340/5.6
(Continued)

FOREIGN PATENT DOCUMENTS

EP    1911553    4/2008

*Primary Examiner* — Joseph H Feild
*Assistant Examiner* — Rufus C Point
(74) *Attorney, Agent, or Firm* — Fletcher Yoder, P.C.

(57) ABSTRACT

In one embodiment, a non-transitory computer readable medium may include computer-executable instructions that, when executed by a processor, may cause processor to receive a set of user data associated with a user that is attempting to access an electronic lock, receive a request to actuate a locking mechanism of the electronic lock configured to prevent the user from accessing a machine in an industrial automation system, actuate the locking mechanism in response to the request and the set of user data corresponding to an expected set of data, store a log of the request and the set of user data, and send the log to a cloud-based computing system.

20 Claims, 15 Drawing Sheets

Related U.S. Application Data continuation-in-part of application No. 15/798,063, filed on Oct. 30, 2017, now Pat. No. 10,025,300, which is a continuation of application No. 14/870,978, filed on Sep. 30, 2015, now Pat. No. 9,804,590.

(60) Provisional application No. 62/139,182, filed on Mar. 27, 2015.

(51) Int. Cl.

| | | |
|---|---|---|
| *G07C 9/00* | (2020.01) | |
| *G05B 19/406* | (2006.01) | |
| *G05B 19/042* | (2006.01) | |
| *F16K 31/00* | (2006.01) | |
| *F16K 35/00* | (2006.01) | |
| *G06F 17/18* | (2006.01) | |
| *H02J 4/00* | (2006.01) | |
| *F16K 37/00* | (2006.01) | |
| *G05B 9/02* | (2006.01) | |
| *G07C 9/27* | (2020.01) | |
| *G07C 9/28* | (2020.01) | |

(52) U.S. Cl.
CPC ............ *F16K 37/0025* (2013.01); *G05B 9/02* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00309* (2013.01); *G07C 9/00571* (2013.01); *G07C 9/00896* (2013.01); *G07C 9/27* (2020.01); *G07C 9/28* (2020.01); *H02J 4/00* (2013.01); *G05B 19/0428* (2013.01); *G05B 2219/21147* (2013.01); *G05B 2219/24156* (2013.01); *G05B 2219/24168* (2013.01); *G05B 2219/31229* (2013.01); *G05B 2219/32368* (2013.01); *G05B 2219/39251* (2013.01); *G05B 2219/50193* (2013.01); *G07C 2209/63* (2013.01); *Y02P 80/10* (2015.11); *Y02P 90/02* (2015.11); *Y02P 90/80* (2015.11)

(58) Field of Classification Search
CPC .......... G05B 19/4184; G05B 19/41875; G07C 9/27; G07C 9/28; G07C 3/00; G07C 9/00309; G07C 9/00571; G07C 9/00896; F16K 31/00; F16K 35/00; F16K 37/0025; G06F 17/18

See application file for complete search history.

(56) References Cited

U.S. PATENT DOCUMENTS

| | | | |
|---|---|---|---|
| 7,616,095 B2 | 11/2009 | Jones et al. | |
| 7,657,814 B2 | 2/2010 | Schuster et al. | |
| 8,046,588 B2 | 10/2011 | Gibart et al. | |
| 8,120,459 B2* | 2/2012 | Kwak | H04L 12/64 340/5.2 |
| 8,854,180 B2* | 10/2014 | Bacarella | E05G 1/026 340/5.6 |
| 9,487,972 B2 | 11/2016 | Vetter et al. | |
| 9,501,046 B2 | 11/2016 | Kalous et al. | |
| 9,804,590 B2 | 10/2017 | Michalscheck et al. | |
| 9,842,446 B2* | 12/2017 | Vecchiotti | G07C 9/20 |
| 10,025,300 B2 | 7/2018 | Michalscheck et al. | |
| 10,382,608 B2* | 8/2019 | Gerhardt | H04W 12/50 |
| 10,713,737 B1* | 7/2020 | Blackburn | G06Q 50/08 |
| 2002/0180582 A1* | 12/2002 | Nielsen | G07C 9/21 340/5.6 |
| 2003/0024992 A1* | 2/2003 | Lewis | G08B 21/02 235/472.01 |
| 2006/0091995 A1* | 5/2006 | Gartner | E05B 47/06 340/5.2 |
| 2007/0194097 A1 | 8/2007 | Jones et al. | |
| 2007/0216764 A1* | 9/2007 | Kwak | G07C 9/00309 348/14.06 |
| 2011/0187493 A1* | 8/2011 | Elfstrom | G07C 9/22 340/5.6 |
| 2012/0280783 A1 | 11/2012 | Gerhardt et al. | |
| 2013/0214903 A1* | 8/2013 | Kalous | E05B 65/48 340/5.61 |
| 2014/0076969 A1* | 3/2014 | Marshall Chesney | G07C 9/23 235/382 |
| 2014/0176303 A1* | 6/2014 | Stratton | G08C 17/02 340/5.61 |
| 2016/0116510 A1* | 4/2016 | Kalous | G07C 9/00571 340/636.1 |
| 2016/0180618 A1* | 6/2016 | Ho | G07C 9/00563 340/5.52 |
| 2016/0248782 A1* | 8/2016 | Troesch | H04L 63/107 |
| 2016/0284183 A1* | 9/2016 | Trani | H04W 4/33 |
| 2017/0076520 A1* | 3/2017 | Ho | G07C 9/38 |
| 2017/0140596 A1* | 5/2017 | Retzlaff | F16P 3/08 |
| 2017/0345239 A9 | 11/2017 | Ho et al. | |
| 2018/0321661 A1* | 11/2018 | Main-Reade | G07C 9/00896 |
| 2020/0149321 A1* | 5/2020 | Griffin | E05B 65/0089 |
| 2020/0339064 A1* | 10/2020 | Gengler | G07C 9/00571 |
| 2020/0410439 A1* | 12/2020 | Blackburn | G06Q 20/065 |

\* cited by examiner

SYSTEMS AND METHODS FOR VIRTUALLY TAGGING AND SECURING INDUSTRIAL EQUIPMENT

CROSS-REFERENCE TO RELATED APPLICATIONS

This application is a continuation application of U.S. application Ser. No. 16/032,941, entitled "Systems and Methods for Virtually Tagging and Securing Industrial Equipment," filed Jul. 11, 2018, which is a continuation-in-part application of U.S. application Ser. No. 15/798,063, entitled "Systems and Methods for Virtually Tagging and Securing Industrial Equipment," filed Oct. 30, 2017, which claims priority to and the benefit from U.S. application Ser. No. 14/870,978, entitled "Systems and Methods for Virtually Tagging and Securing Industrial Equipment," filed Sep. 30, 2015, which claims priority to and the benefit from U.S. Provisional Application Ser. No. 62/139,182, entitled "Systems and Methods for Exchanging Information Between Devices in an Industrial Automation Environment," filed Mar. 27, 2015, each of which are hereby incorporated by reference in its entirety for all purposes.

BACKGROUND

The present disclosure generally relates to an industrial automation system. More particularly, the present disclosure relates to systems and methods for virtually tagging and securing industrial automation equipment, such as a machine, using an electronic lock when placing the machine offline.

BRIEF DESCRIPTION

In one embodiment, a non-transitory computer readable medium may include computer-executable instructions that, when executed by a processor, may cause processor to receive a set of user data associated with a user that is attempting to access an electronic lock, receive a request to actuate a locking mechanism of the electronic lock configured to prevent the user from accessing a machine in an industrial automation system, actuate the locking mechanism in response to the request and the set of user data corresponding to an expected set of data, store a log of the request and the set of user data, and send the log to a cloud-based computing system.

In one embodiment, a system may include an electronic lock including a first processor configured to receive a plurality of requests to actuate the electronic lock from a plurality of users and a locking mechanism of the electronic lock configured to physically actuate the electronic lock. The system may also include a cloud-based computing system including a second processor configured to receive the plurality of requests from the first processor, receive a user dataset associated with each user of the plurality of users via one or more sensors disposed on the electronic lock, and access a database including a plurality of user permissives. Each user permissive of the plurality of user permissives may correspond to one or more conditions associated with allowing an individual to actuate the electronic lock. The second processor may also be configured to determine a ranking of the plurality of users based on the user dataset associated with each user of the plurality of users and the plurality of user permissives and send an actuation signal to the electronic lock. The actuation signal may be configured to actuate the locking mechanism for a first user of the plurality of users having a higher ranking than a second user of the plurality of users according to the ranking.

In one embodiment, an electronic lock configured to selectively enable one or more users to access a machine in an industrial automation system may include a locking mechanism and a transceiver configured to send data associated with the locking mechanism to a cloud-based computing system. The data may include a log of users that actuated or attempted to actuate the locking mechanism. The electronic lock may also include a processor configured to record the log of users that actuated or attempted to actuate the locking mechanism and receive a current actuation request from a user of the one or more users to actuate the locking mechanism. The processor may also be configured to actuate the locking mechanism in response to determining that the current actuation request corresponds to one or more expected actuation requests for the user determined based on the log of users that actuated or attempted to actuate the locking mechanism and in response to determining that the current actuation request is associated with a plurality of conditions that correspond to a user permissive indicative of when the user can actuate the locking mechanism.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
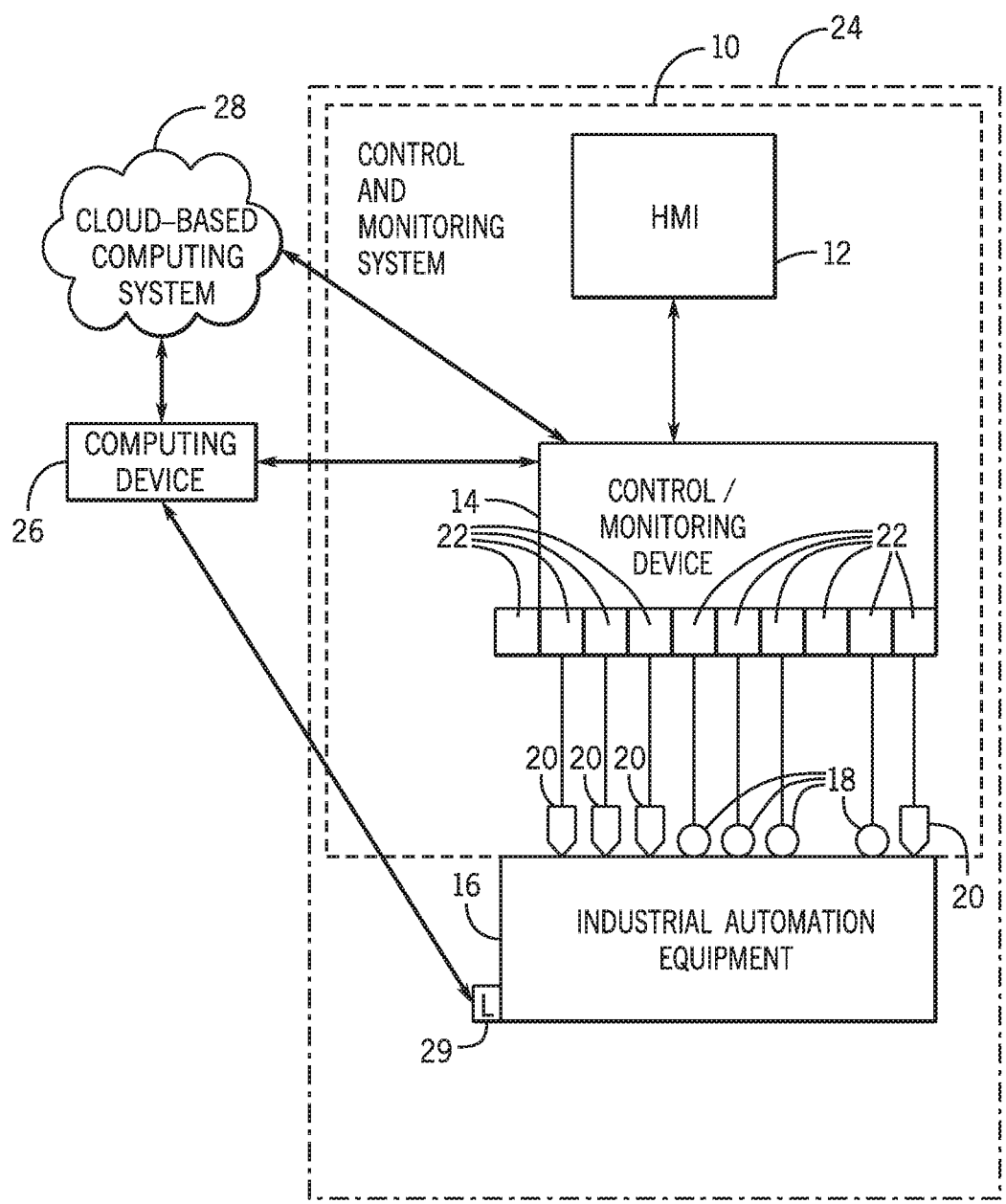
FIG. 1 is a diagrammatical representation of an exemplary control and monitoring system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, the present disclosure discusses numerous concepts regarding how devices in an industrial automation system may exchange information with each other and use this shared information to assist users in the industrial automation environment to manage the operations and maintenance of the devices. In one embodiment, the industrial automation system may include a communication architecture that is structured according to a tri-partite paradigm that facilitates communications between a device, a computing device, and a cloud-based computing system. The information shared between each component within this tri-partite structure may enable various devices within the industrial automation system to operate more efficiently, users to perform tasks related to the conditions or operations of the industrial automation system more efficiently, and generally provide for improved operations of the industrial automation system. In addition, the information shared within the tri-partite structure may include data related to one or more electronic locks used to physically lock out industrial automation equipment, thereby removing the equipment from operation. The information may be related to the location of the electronic lock, actuation command signals, information related to whether certain steps of a procedure (e.g., lockout-tagout procedure) have been performed, alert notifications when the electronic lock is being tampered with, a log of actuation times and users operating the electronic locks, and so forth.

In one embodiment, this tri-partite paradigm may involve a software application operating on the computing device, such that the software application may monitor, control, access, or view industrial automation equipment in the industrial automation system. Further, the software may be used to control actuation of the electronic locks. The computing device may feed data acquired from the industrial automation equipment, control/monitoring device, cloud-based computing system, electronic lock, or the like to the software application used to actuate the electronic locks. The software application may then track and monitor the data to assist the technician with regard to the maintenance and operation of the equipment. Further, the data may be used by the software to control the operation of the equipment of the industrial automation system. In some embodiments, the software application may assist the technician to perform a lockout-tagout procedure, which may detail how to place equipment offline such that the technician can perform maintenance on the respective equipment. Using the data from the electronic locks, the software application may disable certain features related to steps of the lockout-tagout procedure being tracked by the software application when the data indicates certain electronic locks have not been locked.

As discussed herein, lockout-tagout procedures are used throughout various industries and research settings to ensure that machinery and/or processes are placed offline properly and not operating during maintenance or servicing. Generally, a lockout-tagout procedure may include physically locking a part of the machinery in one position (e.g., off) to prevent the part from shifting to an alternate position (e.g., on). The procedure may then involve tagging or placing a label on the device to indicate that the machinery is locked out or is being serviced. It should be noted that, in some embodiments, an electronic version of the tag or label may be included in an electronic lock (e.g., a display (e.g., liquid-crystal display, electronic ink) of the electronic lock may display certain information similar to the tag or label). Typically, the tag may include information such as a statement (e.g., "do not operate—equipment locked out"), an identity of a person who affixed the tag to the device, and/or a timestamp of when the tag is affixed. Also, manual locks may be employed when physically locking the parts of the industrial automation equipment offline. That is, a technician manually actuates the locks to the locked positions.

Certain embodiments of the present disclosure relate to providing electronic locks that may be remotely actuated via an electronic device, such as the computing device (e.g., tablet computer or a mobile device). The electronic locks may request certain credentials and/or status checks for activation. Moreover, the electronic locks may be used for sequential unlock permissions, sequential accessibility (ordering of tasks), user credentials, and the like. As such, the electronic locks may use multi-factor authentication to create a soft virtual lock. For example, an electronic lock may be actuated based on user credentials, as well as based on whether certain procedures have been performed. The procedures may specify that locking out a machine be performed after upstream devices are powered down and certain valves have been depressurized. In this example, the software application may allow an authorized user to actuate the electronic lock after these two steps have been performed. As a result, the software application may require that certain steps are performed prior to a device being placed offline to ensure that when the device is placed offline, the device is placed offline properly. Moreover, the software application may help ensure that the technician is operating safely.

Further, in some embodiments, the electronic locks may include location information or a beacon that may be used to assist the software application operating on the computing device to identify a particular position or location of the electronic lock. Further, the software application may determine directions to the electronic locks from the computing device executing the software application and display the directions on the electronic device. Additional details with regard to the electronic locks described above will be discussed in more detail with reference to FIGS. 1-10 below.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements. Although not depicted in FIG. 1, the control and monitoring system 10 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include motors, protection devices, switchgear, compressors, and the like.

In certain embodiments, one or more properties of the industrial automation equipment 16 may be monitored and controlled by certain equipment for regulating control variables. For example, sensors 18 and actuators 20 may monitor various properties of the industrial automation equipment 16 and may be involved to adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP®, ControlNet®, DeviceNet®, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE 802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28. Further, the computing device 26 may be communicatively coupled to the cloud-based computing system 28 and one or more electronic locks 29 that are used to physically lock the industrial automation equipment 16 in a state (e.g., off). For example, the computing device 26 may send a command signal to the electronic lock 29 to actuate and lock the industrial automation equipment 16 according to lockout-tagout procedures associated with respective industrial automation equipment 16.

Figure 2:
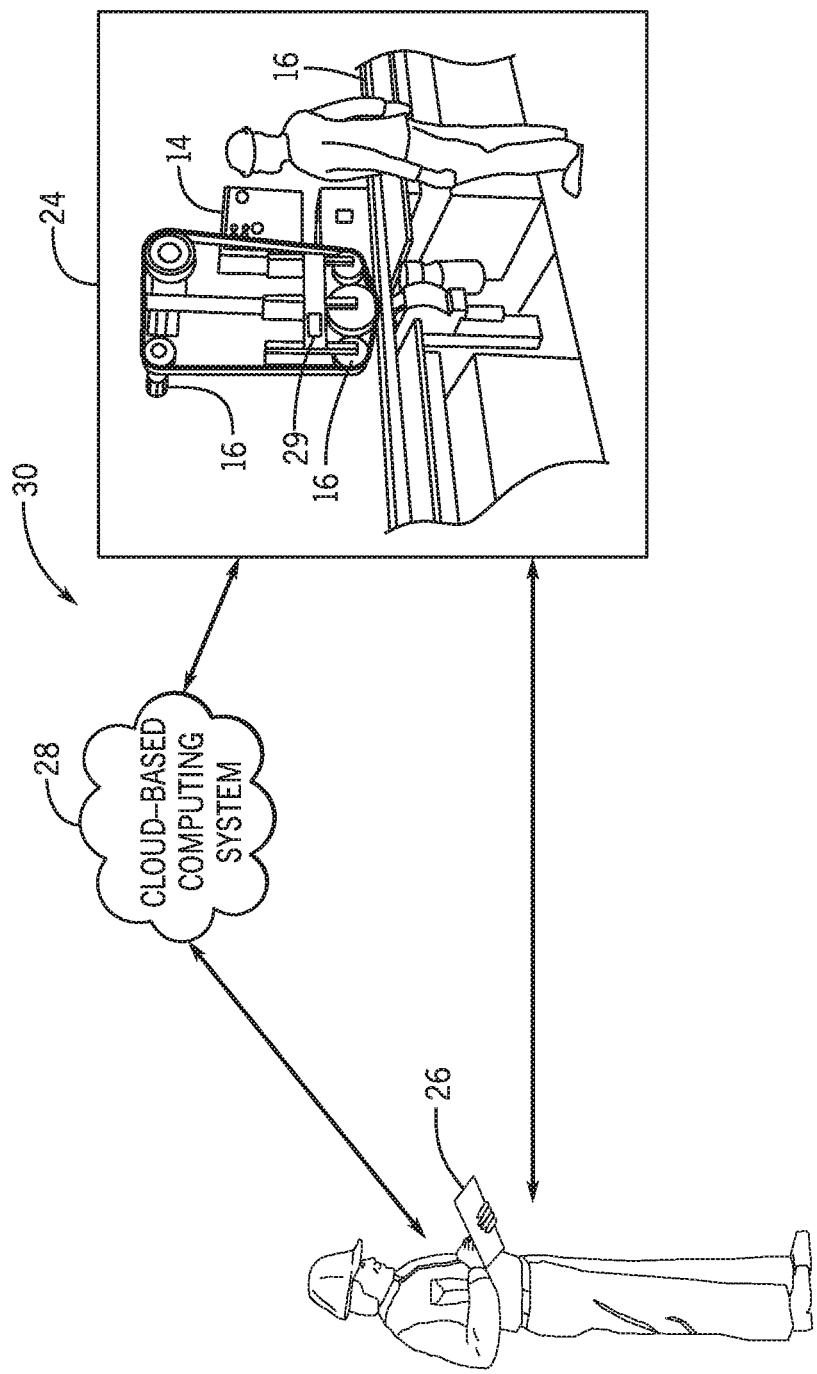
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16. One or more electronic locks 29 may be used to physically lock the industrial automation equipment 16 according to lockout-tagout procedures.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network. In some embodiments, the computing device 26 and the cloud-based computing system may be in communication with the one or more electronic locks 29.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
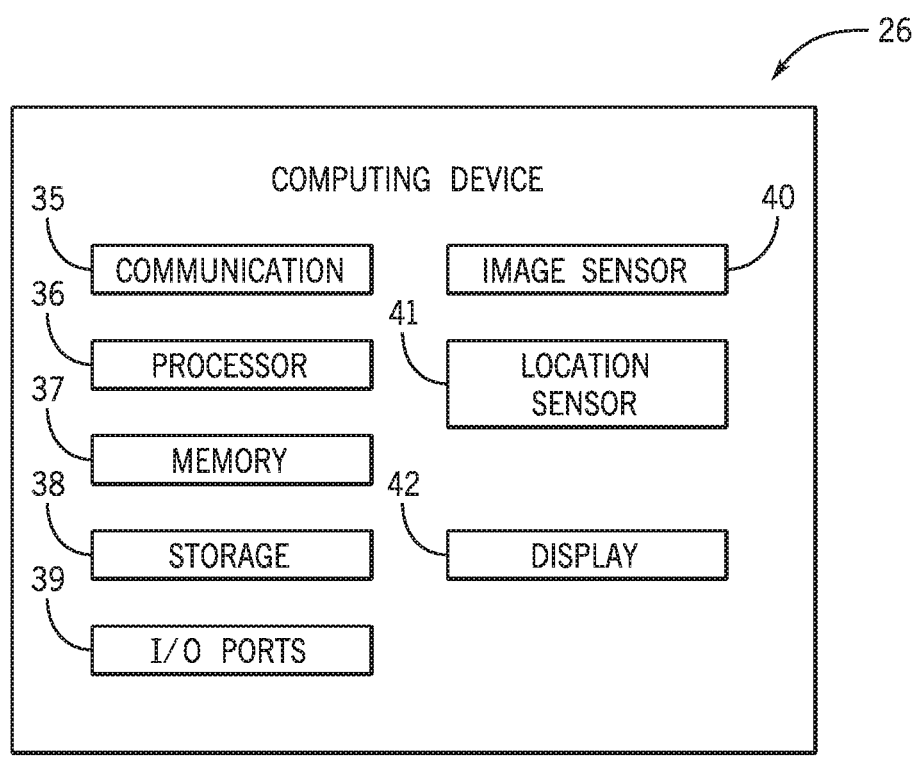
FIG. 3 is a block diagram of example components within a computing device that is part of the communication network of FIG. 2, in accordance with embodiments presented herein.

FIG. 3 is a block diagram of example components within the computing device 26 that is part of the communication network 30 of FIG. 2, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a display 42, additional sensors (e.g., vibration sensors, temperature sensors), and the like. The communication component 35 may be a wireless or wired communication component that may facilitate communication between the industrial automation equipment 16, the cloud-based computing system 28, electronic locks 29, and other communication capable devices.

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16, as well as control the actuation of the electronic locks 29. As such, the computing device 26 may communicatively couple to industrial automation equipment 16 or to a respective computing device of the industrial automation equipment 16 via a direct connection between the two respective devices or via the cloud-based computing system 28. Also, the computing device 26 may communicatively couple to the electronic locks 29 via a direct connection between the two respective devices or via the cloud-based computing system 28. Additionally, the memory 37 may be used to store the processor executable instructions for determining when to actuate the electronic locks 29. For example, the instructions may specify that credentials of the user are authorized and certain steps of the lockout-tagout procedures are completed prior to sending an actuation signal to the electronic locks 29. In some embodiments, the instructions also may determine the location of the electronic locks 29 based on location information received from the electronic locks 29, among other things.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout-tagout, placing device offline, replacing component, servicing device) for the industrial automation equipment 16, and the like. Also, the display 42 may display the location and/or position of the electronic lock 29 and may display navigational directions to the electronic lock 29. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial equipment 16. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
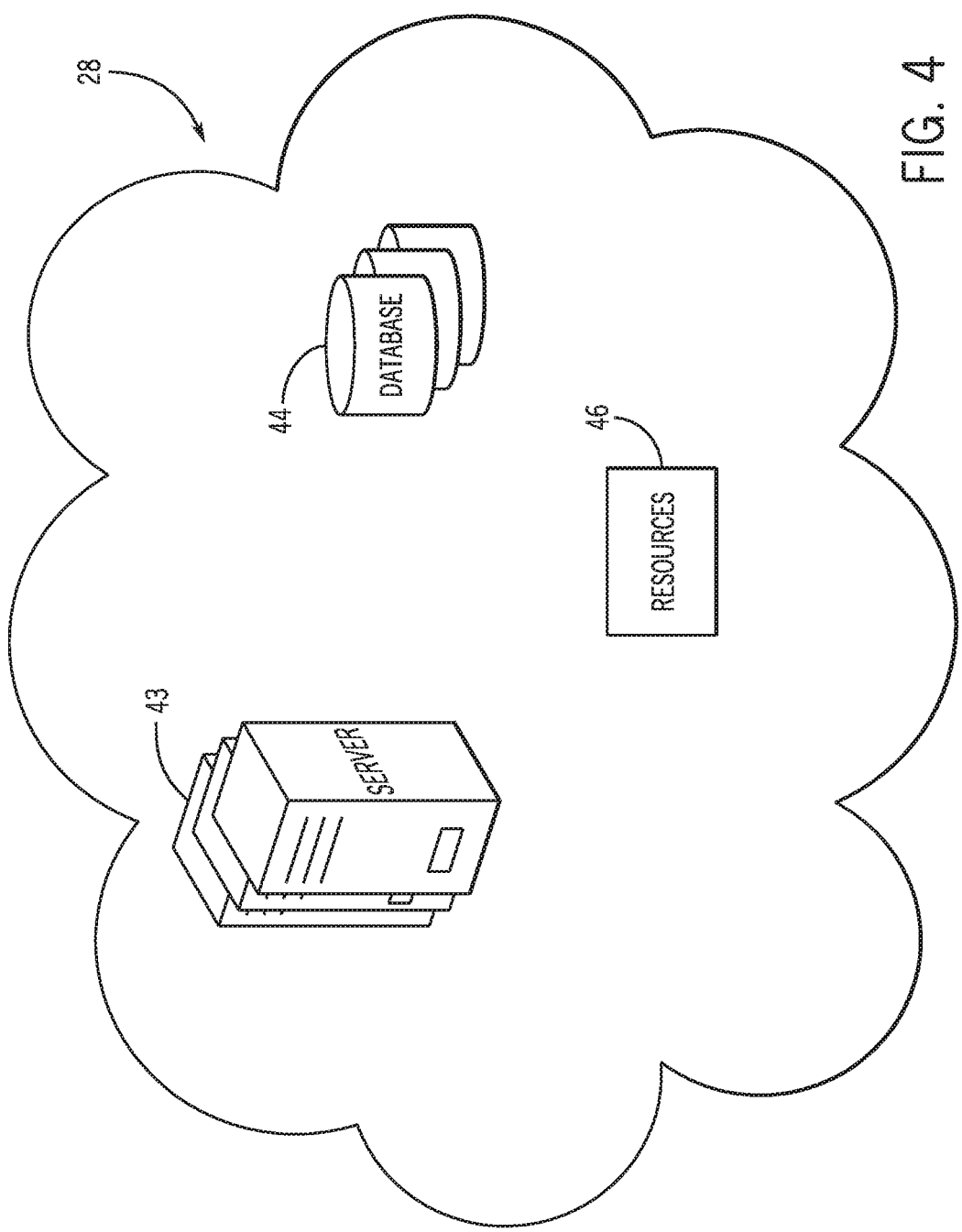
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a resource database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
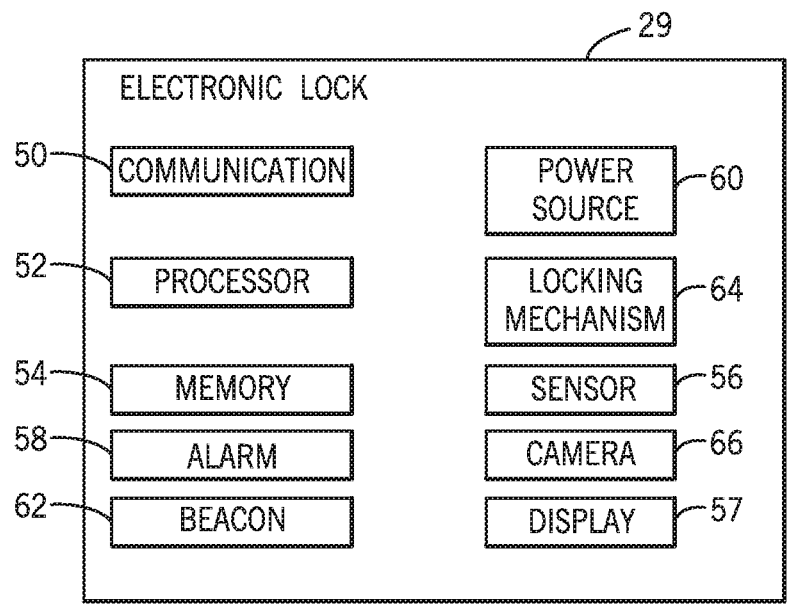
FIG. 5 is a block diagram of example components of an electronic lock, in accordance with embodiments presented herein.

FIG. 5 is a block diagram of example components of the electronic lock 29, in accordance with embodiments presented herein. It should be noted, that the electronic lock 29 may include several similar components as the computing device 26. For example, the electronic lock 29 may include a lock communication component 50, a lock processor 52, a lock memory 54, a lock sensor 56, and a lock display 57. The lock communication component 50 may facilitate communicatively coupling to the computing device 26, the cloud-based computing system 28, and/or the control/monitoring device 14. The lock communication component 50 may be programmed to communicate over any suitable wired and/or wireless network, such as Ethernet, WiFi, Bluetooth® Low Energy (BLE), ZigBee®, and so forth. In some embodiments, the lock communication component 50 includes a transceiver enabled to receive and transmit data.

The lock processor 52 may be any type of computer processor or microprocessor capable of executing computer-executable code. The lock processor 52 may also include multiple processors that may perform the operations described below. The lock memory 54 may be any suitable articles of manufacture that can serve as media to store processor-executable code, data, or the like. These articles of manufacture may represent computer-readable media (e.g., any suitable form of memory or storage) that may store the processor-executable code used by the lock processor 52 to perform the presently disclosed techniques. The lock memory 54 may also be used to store the data, analysis of the data, the software applications, and the like. The lock memory 54 may represent non-transitory computer-readable media (e.g., any suitable form of memory or storage) that may store the processor-executable code used by the lock processor 52 to perform various techniques described herein. It should be noted that non-transitory merely indicates that the media is tangible and not a signal. Generally, the lock processor 52 may execute a software application that maintains a record of times in which the electronic lock 29 is opened and/or closed, identifies a person or user who may have operated the electronic lock 29, perform one or more preventative actions (e.g., send alert or send signals to shut down the industrial automation equipment 16) when the electronic lock 29 is being tampered with, and the like.

The lock sensor 56 may be used to detect users that are operating the electronic lock 29 and/or are in the area where the industrial automation equipment 16 is located. The lock sensor 56 may include a receiver circuit (e.g., radio-frequency identification (RFID) reader) that reads or detects a signal from a transmitter circuit (e.g., RFID tag) in an access badge. The lock sensor 56 may be communicatively coupled to the lock processor 52 and send signals to the lock processor 52. The lock processor 52 may determine the identity of the user based on the signals and log the users that access the electronic lock 29 and/or the area including the industrial automation equipment 16. In some embodiments, the lock sensor 56 may include a vibration sensor enabled to detect vibrations or a level sensor to detect angle, which the lock processor 52 may use to determine whether the electronic lock 29 is being tampered with. For example, the lock processor 52 may have a range of expected vibration or level data associated with normal contact of the electronic lock 29. When the lock processor 52 receives vibration data that exceeds the range, the lock processor 52 may determine that the electronic lock 29 is being tampered with.

In some embodiments, the electronic lock 29 may also include the lock display 57. The lock display 57 may include liquid crystals (e.g., a liquid-crystal display (LCD)), light emitting diodes (LEDs), or electronic ink). In some embodiments, electronic ink may be used to preserve display during absence of an energy level of the power source 60. The lock display 57 may display any suitable information stored in the lock memory 54 and/or obtained from the computing device 26 and/or the cloud-based computing system 28. For example, the lock display 57 may display certain information related to tagging the industrial automation equipment 16 after the equipment is locked out. That is, the lock display 57 may display an identity of a technician that locked the electronic lock 29, a message (e.g., a warning not to unlock or tamper with the electronic lock 29), and a timestamp of when the technician locked the electronic lock 29. Further, in some embodiments, the lock display 57 may display a history of the timestamps at which the electronic lock 29 was locked and unlocked as well as the identity of the technician who locked and unlocked the electronic lock 29. As may be appreciated, a physical tag or label may not be used in an embodiment where the electronic lock 29 uses the lock display 57 to display the tagging information. However, in some embodiments, a physical tag or label may be used in conjunction with the lock display 57 to display the tagging information.

In some embodiments, the electronic lock 29 may also include an alarm 58 that is controlled by the lock processor 52. The alarm 58 may include a speaker to emit an audible noise that may be used to indicate when energy of a power source 60 is below a threshold. Additionally, the alarm 58 may emit the noise when the electronic lock 29 is being tampered with. In some embodiments, tampering may refer to the electronic lock 29 being moved in an unexpected way, being disturbed, experiencing an unexpected change in temperature, being unable to communicate with other devices, and so forth. In some embodiments, the alarm 58 may include a light source enabled to display a certain light color depending on the severity of the alarm-triggering event. The light source may include a light-emitting diode (LED), a laser, or the like.

In some embodiments, the power source 60 may store a charge and provide power for the electronic lock 29. The power source 60 may include a pre-charged battery that is replaceable when the stored power is depleted or a rechargeable battery that can be recharged using another source of power. In some embodiments, the power source 60 may include any suitable number of batteries and combination of types of batteries (e.g., pre-charged or rechargeable). Further, in some embodiments, the power source 60 may include an energy-harvesting device that collects energy from its environment. The energy-harvesting device may use various energy harvesting techniques that turn ambient light, heat, movement, and so forth into energy to charge the power source 60. For example, the energy-harvesting device may include a piezoelectric material that enables converting kinetic energy (e.g., from vibration of industrial automation equipment 16) into electrical energy that can be stored by the power source 60. The energy-harvesting device may also include a thermoelectric energy harvesting device and/or an ambient light-harvesting device. A thermoelectric energy-harvesting device may generate electricity in the presence of temperature differences between substrate layers. Additionally, the power source 60 may include a continuous source of alternating current (AC) power.

In some embodiments, the electronic lock 29 may include a beacon 62 (e.g., Bluetooth® Low Energy) that may send location information regarding the electronic lock 29 to the computing device 26 and/or any communicatively connected device. The beacon 62 may include electronic circuitry that is capable of broadcasting a signal including the location information, position information, proximity to other devices information, or some combination thereof. The signal may be received by other electronic devices listening at a certain frequency. In some embodiments, the electronic circuitry of the beacon 62 may be capable of sending the signal directly to devices that are connected to the beacon 62. The software application operating on the computing device 26 may use the location information to identify a particular position and/or location of the electronic lock 29. For example, in some embodiments, the beacon 62 may emit coordinates to its location (e.g., a unique identifier indicative of physical location of the beacon 62), the location of the electronic lock 29, and/or the location of the industrial automation equipment 16. In one embodiment, the lock processor 52 may use triangulation schemes to assist the computing device 26 in determining directions to the electronic lock 29 or the industrial automation equipment 16. Triangulation schemes may include determining the location of the electronic lock 29 or the industrial automation equipment 16 by measuring the angles to the electronic lock 29 or the industrial automation equipment 16 from known points at the ends of a fixed baseline (e.g., a wall of a facility, a line between two other known points (other industrial automation equipment in the facility)). In some embodiments, emitters may be strategically placed in the facility for the purpose of finding the location of the electronic lock 29 or the industrial automation equipment 16 by broadcasting the location of the emitters for devices (e.g., computing device 26) to read. The location of the electronic lock 29 or the industrial automation equipment 16 can be fixed as the third point of a triangle based on known locations, such as the locations of the emitters. As described below, the location of the electronic device 29 may enable the computing device 26 to determine navigational directions to the electronic lock 29 based on the signal provided by the beacon 62.

In some embodiments, the electronic lock 29 may include a locking mechanism 64. The locking mechanism 64 may include mechanical components that are moved via actuators controlled by the lock processor 52. For example, one such locking mechanism 64 may include a magnet and an adjustable cable. The lock processor 52 may send signals to the power source 60 to supply current to the magnet so a magnetic field is generated that either attracts or repels the adjustable cable, which may be made of a ferromagnetic material (e.g., metal, iron, or nickel), depending on whether the lock processor 52 is locking or unlocking the electronic lock 29.

In some embodiments, the locking mechanism 64 may include gears that move the adjustable cable. In some embodiments, the gears may turn in response to a magnetic field generated by the magnet. Additionally, the locking mechanism 64 may include a motor that moves the gears, which in turn move the adjustable cable. In some embodiments, the motor may be powered by the power source 60 of the locking mechanism 64.

In some embodiments, the electronic lock 29 may include a camera 66. The camera 66 may be used to capture image/video data and send the image/video data to the lock processor 52 for analysis. The lock processor 52 may use facial recognition techniques while analyzing the image/video data to determine the identity of the user in the image/video data and then log the identity of the user that is identified and the date/time that the user was identified. As discussed above, the identity of the user may be logged if the user is determined to be accessing the electronic lock 29 and/or the area including the industrial automation equipment 16.

Although the components described above have been discussed with regard to the electronic lock 29 that is separate from the industrial automation equipment 16, it should be noted that the electronic lock 29 may be integrated in the industrial automation equipment 16 and may be part of the industrial automation equipment 16. In such an embodiment, the integral electronic lock 29 may include similar components described above. Further, it should be noted that the listed components are provided as example components and the embodiments described herein are not to be limited to the components described with reference to FIG. 5.

Figure 6:
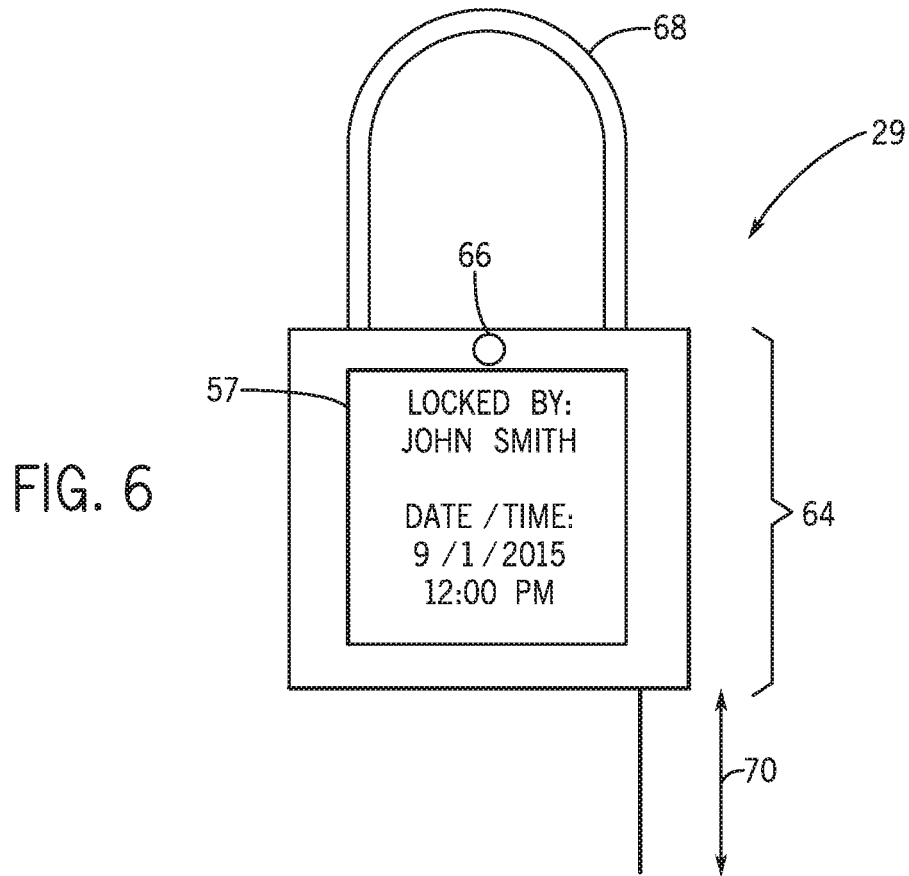
FIG. 6 is a diagrammatical representation of an electronic lock, in accordance with embodiments presented herein.

FIG. 6 is a diagrammatical representation of an electronic lock, in accordance with embodiments presented herein. As depicted, the electronic lock 29 includes the locking mechanism 64. The locking mechanism 64 may include an adjustable cable 68 made of a ferromagnetic material and a magnet internal to the electronic lock. As shown by arrow 70, the adjustable cable 68 may move up and down to unlock and lock the electronic lock 29. That is, the magnet is used to pull the adjustable cable 68 down to a locked position and to push the adjustable cable 68 up to an unlocked position. As previously discussed, the lock processor 52 may instruct the power source 60 to supply current to the magnet to generate a magnetic field to either attract or repel the adjustable cable 68.

Additionally, as mentioned above, in some embodiments, the locking mechanism 64 may include gears and a small motor coupled to at least one of the gears via a shaft. When the small motor is activated, the shaft may rotate, thereby causing the gears to rotate. Depending on the direction of rotation, the gears may pull the adjustable cable 68 down to the locked position or push the adjustable cable 68 up to the unlocked position. In yet another embodiment, the locking mechanism 64 may include the magnet, gears, and the adjustable cable. The magnetic field generated by the supplied current may cause the gears to rotate in a desired direction, thereby moving the adjustable cable 68.

In some embodiments, the electronic lock 29 may include the lock display 57, which may display certain information related to tagging the industrial automation equipment 16 after the electronic lock 29 has been locked. As depicted, the lock display 57 shows the technician responsible for locking the electronic lock 29 (e.g., "John Smith") and the timestamp that the technician locked the electronic lock 29 (e.g., 9/1/2015 12:00 PM). It should be understood that the displayed information is illustrative only and not meant to limit the scope of information presented by the lock display 57. For example, the lock display 57 may display a message, such as a warning not to unlock or tamper with the electronic lock 29. Additionally, the lock display 57 may display a history of timestamps when the electronic lock 29 was locked and/or unlocked, as well as the technician responsible for locking and/or unlocking the electronic lock 29. In some embodiments, the lock display 57 may display a reason why the electronic lock 29 was locked. In some embodiments, the lock display 57 may display an alert when certain events occur (e.g., when the electronic lock 29 is being tampered with). The alert may include changing the font color (e.g., red), changing font size, changing background color, and so forth.

As discussed above, the camera 66 may be used to capture image/video data. As depicted, the camera 66 may be located on a front panel of the electronic lock 29 in proximity to the lock display 57. However, it should be noted that the camera 66 and the lock display 57 may be arranged in any suitable location on the electronic lock 29. In some embodiments, the camera 66 may be used to capture image/video data when a user is locking and/or unlocking the electronic lock 29 (e.g., via the computing device 26). For example, the image/video data may be sent to the lock processor 52, which may use facial recognition techniques while analyzing the image/video data to determine the identity of the user in the image/video data and then log the identity of the user that is identified and the date/time that the user was identified. As discussed above, the identity of the user may be logged if the user is determined to be accessing the electronic lock 29 and/or the area including the industrial automation equipment 16.

In some embodiments, more than one user may request to actuate (e.g., lock) the electronic lock 29. In some embodiments, the electronic lock 29 may be locked after a first authorized user requests to lock the electronic lock 29 (e.g., using a computing device 26). Then, when additional authorized users request to actuate the electronic lock 29 (e.g., using a computing device 26) and the electronic lock 29 is already actuated, an authorized user count may be incremented. In some embodiments, the authorized user count may be maintained by the processor 36 of the computing device 26 or the lock processor 52 of the electronic lock 29. Also, the processor 36 and/or the lock processor 52 may keep track of the identities of the users that request to lock the electronic lock 29 and the timestamps the electronic lock 29 is locked. In some embodiments, the authorized user count may be displayed on the lock.

Figure 7:
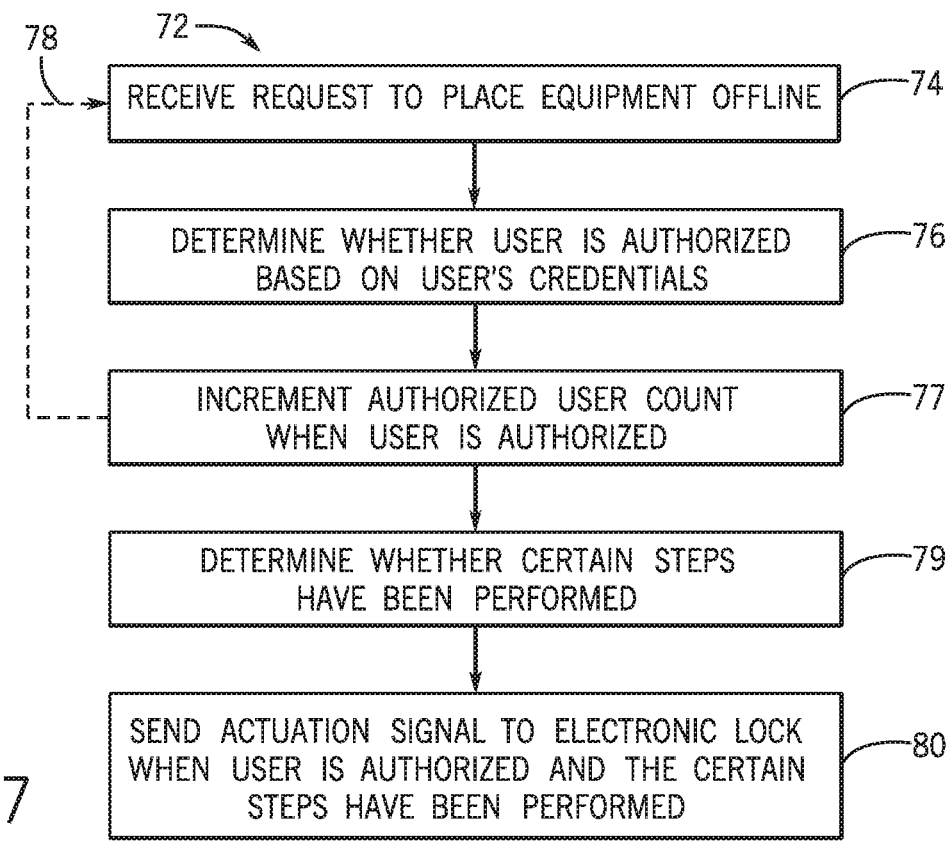
FIG. 7 is a flow diagram of a method for controlling actuation of the electronic lock of FIG. 6, in accordance with embodiments presented herein.

FIG. 7 is a flow diagram of a method 72 for controlling actuation of the electronic lock 29 of FIG. 6, in accordance with embodiments presented herein. Although the following description of the method 72 is described as being performed by the processor 36 of the computing device 26, it should be noted that the method 72 may be performed by other processors disposed on other devices that may be capable of communicating with the electronic lock 29, such as the cloud-based computing system 28, the industrial automation equipment 16, the control/monitoring device 14, or other components associated with the industrial application 24. In some embodiments, the method 72 may be performed by the processor 52 of the electronic lock 29. Additionally, although the following method 72 describes a number of operations that may be performed, it should be noted that the method 72 may be performed in a variety of suitable orders and all of the operations may not be performed. It should be appreciated that the method 72 may be wholly executed by the computing device 26 or the execution may be distributed between the computing device 26 and/or the cloud-based computing system 28.

Referring now to the method 72, the processor 36 may receive (block 74) a request to place the industrial automation equipment 16 offline according to the lockout-tagout procedures. The request may be received as input from the user, as a signal from the industrial automation equipment 16, the electronic lock 29, the control/monitoring device 14, the cloud-based computing system 28, other industrial automation equipment located in the facility, or the like. The processor 36 may determine (block 76) whether the user associated with the request is authorized to place the industrial automation equipment 16 offline based on credentials of the user. For example, the processor 36 may prompt the user to enter an employee identification number, a username, or the like and an associated password, and then verify the credentials in a database to determine the access rights associated with the credentials. In some embodiments, the processor 36 may use single sign-on (SSO) and already possess the credentials from when the user entered them by initially logging into the software. Also, the processor 36 may have remembered the credentials of the user, thereby skipping over prompting the user for the credentials. If the credentials of the user do not have sufficient access rights to place the industrial automation equipment 16 offline, then the processor 36 may deny the request. Additionally, the processor 36 may disable certain features of the lockout-tagout procedures being displayed on the display 42 that are tied to the missing access rights by graying the procedures out and making their icons/buttons inoperable, removing procedures from the graphical user interface (GUI), or the like.

The processor 36 may also determine (block 78) whether certain steps of a procedure (e.g., lockout-tagout) have been performed. That is, in some embodiments, the lockout-tagout procedures may specify that certain steps are completed prior to physically locking the industrial automation equipment 16. For example, locking out a machine may be specified as being performed after upstream devices are powered down and certain valves have been depressurized. When the user is authorized and/or when the certain steps have been performed, the processor 36 may send (block 80) an actuation signal to the electronic lock 29 to lock. In the above example, the processor 36 may send the actuation signal to the electronic lock 29 when the upstream devices are powered down and the certain valves are depressurized and the user is authorized. However, when the upstream devices are not powered down, the certain valves are not depressurized, or the user is not authorized, the processor 36 may not send the actuation signal to the electronic lock 29. In this way, the electronic lock 29 may be used for sequential unlock permissions, sequential accessibility (ordering of tasks), user credentials, and the like. As such, the electronic lock 29 may use multi-factor authentication to create a soft virtual lock.

In some embodiments, the processor 36 determines whether the steps have been performed (e.g., upstream devices are powered down and/or the valves are depressurized) in a number of ways. For example, the processor 36 may receive data input by the technician using a touch-screen display 42 or other input peripheral of the computing device 26 that indicates completion of the steps (e.g., powering down the upstream devices and/or depressurizing the valves). In another example, the processor 36 may determine that the steps are performed when a confirmation is received that indicates the upstream devices are powered down or the valves are depressurized. For example, voltage meters on a voltage bus may determine that the upstream devices are powered down, and the voltage meters may send a confirmation message indicating the same to the processor 36. Also, a controller that controls the upstream devices may determine that the upstream devices are powered down, and the controller may send a confirmation message indicating the same to the processor 36. In addition, pressure sensors monitoring the valves may detect that the valves are depressurized and send a confirmation message indicating the same to the processor 36. In some embodiments, the data related to whether the steps (e.g., upstream systems are powered down and/or the valves are depressurized) are complete may be communicated to the cloud-based computing system 28 by the processor 36, the voltage meter, the controller, the pressure sensor, and so forth. The processor 36 may receive the data related to completion of the steps (e.g., powering down of upstream devices and/or depressurization of valves) from the cloud-based computing system 28. It should be noted that, in some embodiments, the processor 52 of the electronic lock 29 may receive the data related to whether the steps are performed from the cloud-based computing system 28 and/or the individual components (e.g., the processor 36 of the computing device 26, the voltage meter, the controller, the pressure sensor) that send the data to the processor 36, as described above.

Figure 8:
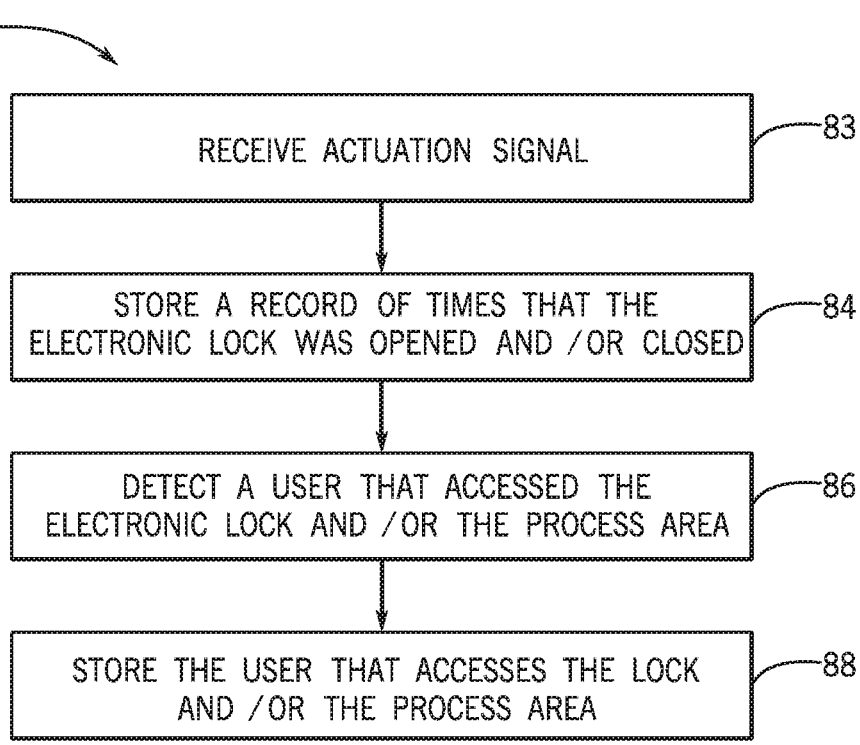
FIG. 8 is a flow diagram of a method for logging information related to operation of the electronic lock, in accordance with embodiments presented herein.

FIG. 8 is a flow diagram of a method 82 for logging information related to operation of the electronic lock 29, in accordance with embodiments presented herein. Although the following description of the method 82 is described with reference to the processor 52 of the electronic lock 29, it should be noted that the method 82 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 82 describes a number of operations that may be performed, it should be noted that the method 82 may be performed in a variety of suitable orders and all of the operations may not be performed. It should be appreciated that the method 82 may be wholly executed by the processor 52 of the electronic lock 29 or the execution may be distributed between the processor 52 of the electronic lock 29 and/or the processor 36 of the computing device 26.

Referring now to the method 82, the processor 52 may receive (block 83) an actuation signal to lock or unlock. The actuation signal may be received from the computing device 26, the cloud-based computing system 28, the control/monitoring device 14, or the like. The processor 52 may store (block 84) a record of times that the electronic lock 29 is opened (e.g., unlocked) and closed (e.g., locked) in the memory 54. The times may enable tracking whether there are certain times of the day that the electronic lock 29 is locked more often than other times, which may indicate trends and enable troubleshooting by focusing attention on those times. The processor 52 may also detect (block 86) a user that accessed the electronic lock 29 and/or the area of the facility including the industrial automation equipment 16. As described above, the user may be detected by using the sensor 56 and/or the camera 66 and the processor 52 may determine the identity of the user. The processor 52 may also store (block 88) the identity of the user that access the electronic lock 29 and/or the area of the facility including the industrial automation equipment 16. As such, the processor 52 virtually tags the electronic lock 29 by storing the user that is responsible for locking the lock 29 and the time at which the lock 29 was locked. The identified user may be indicated on the display 57. Storing or displaying this information may avoid use of traditional physical tags. The computing device 26 can contact the electronic lock 29 at any time and request the tagged information to determine who locked the electronic lock 29 and when the person locked the lock 29. Storing (block 88) information regarding the user that accesses the lock 29 and/or the area of the facility including the industrial automation equipment 16 may also include sending the identity of the user responsible for locking the lock 29 and the time at which the lock 29 was locked to the cloud-based computing system 28 for storage. In some embodiments, any computing device 26 in communication with the cloud-based computing system 28 may receive the stored information from the cloud-based computing system 28 to view as virtual tags on respective industrial automation equipment 16 located in the facility in a visualization depicted on the display 42.

Figure 9:
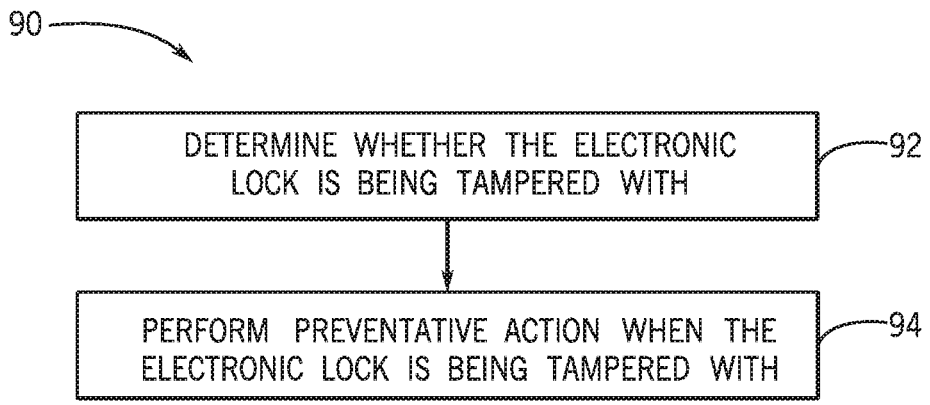
FIG. 9 is a flow diagram of a method for performing a preventative action based on whether the electronic lock of FIG. 6 is being tampered with, in accordance with embodiments presented herein.

FIG. 9 is a flow diagram of a method 90 for performing a preventative action based on whether the electronic lock 29 of FIG. 6 is being tampered with, in accordance with embodiments presented herein. Although the following description of the method 90 is described with reference to the processor 52 of the electronic lock 29, it should be noted that the method 90 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 90 describes a number of operations that may be performed, it should be noted that the method 90 may be performed in a variety of suitable orders and all of the operations may not be performed. It should be appreciated that the method 90 may be wholly executed by the electronic lock 29 or the execution may be distributed between the electronic lock 29 and/or the computing device 26.

Referring now to the method 90, the processor 52 may determine (block 92) whether the electronic lock 29 is being tampered with. That is, the processor 52 may receive signals from the sensor 56 that are indicative of tampering. For example, one sensor 56 may include a temperature sensor and may send signals to the processor 52 that indicate the electronic lock 29 increasing or decreasing in temperature at a rate above some threshold. In another example, the sensor 56 may include a vibration sensor that provides signals indicating that the electronic lock 29 is vibrating greater than some threshold. Further, the image/video data obtained by the camera 66 may be used by the processor 52 to determine that the electronic lock 29 is being tampered with. The processor 52 may perform (block 94) one or more preventative actions when the processor 52 determines that the electronic lock 29 is being tampered with. The preventative actions may include the processor 52 triggering the alarm 58 to emit an audible noise and/or colored light, sending an alert notification to an appropriate device (e.g., the computing device 26, the cloud-based computing system 28, and/or the control/monitoring device 14), sending command signals to shut down the industrial automation equipment 16 or any other equipment in the facility, logging the identity of the user identified in the image/video data captured by the camera 66 or read by the RFID reader, and so forth.

Figure 10:
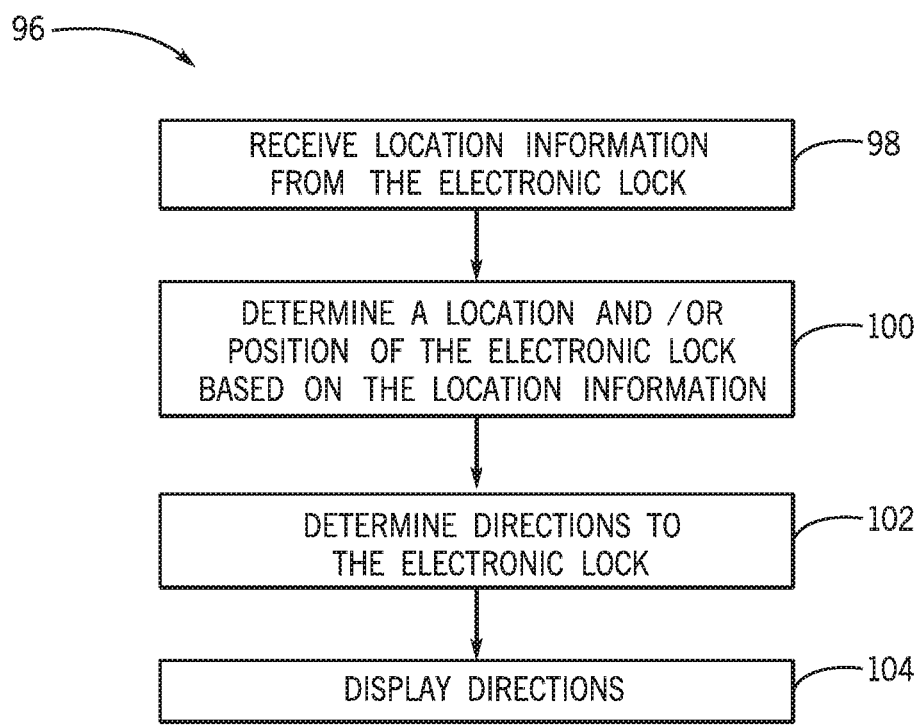
FIG. 10 is a flow diagram of a method for using location information from the electronic lock of FIG. 6 to determine directions to the electronic lock, in accordance with embodiments presented herein.

FIG. 10 is a flow diagram of a method 96 for using location information from the electronic lock 29 of FIG. 4 to determine directions to the electronic lock 29, in accordance with embodiments presented herein. Although the following description of the method 96 is described with reference to the processor 36 of the computing device 26, it should be noted that the method 96 may be performed by other processors disposed on other devices that may be capable of communicating with the electronic lock 29, such as the cloud-based computing system 28, the industrial automation equipment 16, the control/monitoring device 14, or other components associated with the industrial application 24. Additionally, although the following method 96 describes a number of operations that may be performed, it should be noted that the method 96 may be performed in a variety of suitable orders and all of the operations may not be performed. It should be appreciated that the method 96 may be wholly executed by the computing device 26 or the execution may be distributed between the computing device 26 and/or the cloud-based computing system 28.

Referring now to the method 96, the processor 36 may receive (block 98) location information from the electronic lock 29. The location information may be sent from the communication component 50, such as a beacon, and the location information may indicate the location and/or position of the electronic lock 29 on the industrial automation equipment 16. The processor 36 may determine (block 100) the location and/or position of the electronic lock 29 based on the location information. Further, the processor 36 may determine (block 102) navigational directions to the electronic lock 29. In some embodiments, the directions may begin from the location of the computing device 26 and end at the location of the electronic lock 29. The processor 36 may display (block 104) the directions on the display 42. As such, the computing device 26 may enable easily locating, servicing, and/or replacing the electronic lock 29 when desired.

It should be noted that the methods 82 and 90 are performed using the processor 52 that is part of the electronic lock 29 and the methods 72 and 96 are performed by the processor 36 of the computing device 26. The electronic lock 29 and the computing device 26 are configured to execute instructions that enable each device to interact with the industrial automation equipment 16. As such, the electronic lock 29 and the computing device 26 are tied to particular machines to assist in the management and operations of the industrial automation equipment 16, and thus, the industrial application 24. Moreover, it should be noted that the data received by the electronic lock 29, the computing device 26, the cloud-based computing system 28, the industrial automation equipment 16, or the control/monitoring device 14 may be transformed when being transmitted, analyzed, or depicted for view by a user of the respective device. For example, the tampering alert generated based on signals received from the sensors 56 and/or image/video data received from camera 66 includes a transformation of the sensor data signals and/or image/video data to the alert. Also, the directions generated based on the location data from the electronic lock 29 include a transformation of the location information to navigational directions. Further, the actuation signal generated by the computing device 26 after multi-factor authentication enables controlling the industrial automation equipment 16.

Figure 11:
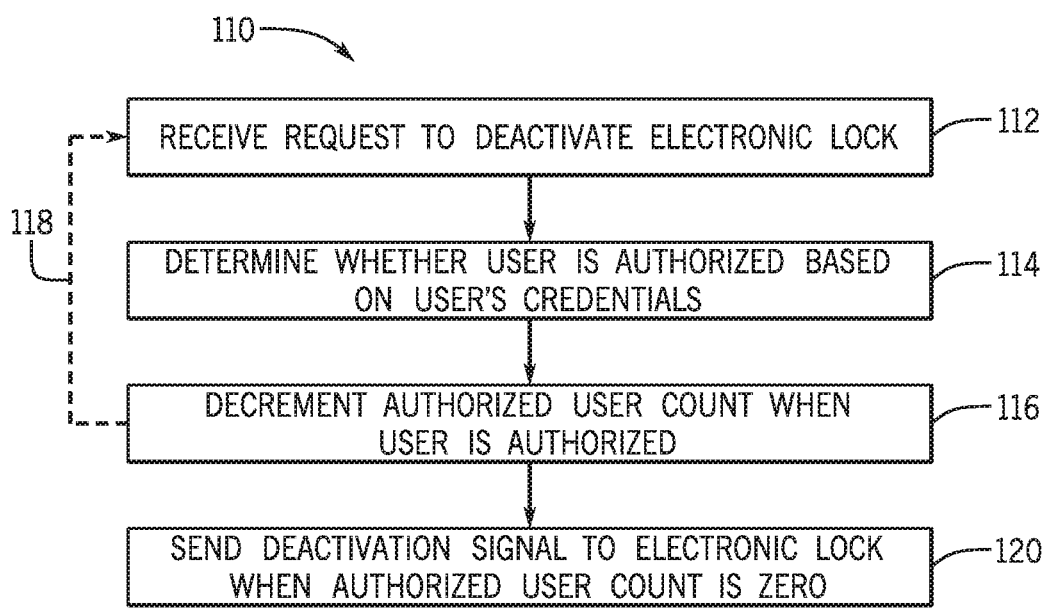
FIG. 11 is a flow diagram of a method for controlling deactivation of the electronic lock of FIG. 6, in accordance with embodiments presented herein.

FIG. 11 is a flow diagram of a method 110 for controlling deactivation of the electronic lock 29 of FIG. 6, in accordance with embodiments presented herein. Although the following description of the method 110 is described with reference to the processor 36 of the computing device 26, it should be noted that the method 110 may be performed by other processors disposed on other devices that may be capable of communicating with the electronic lock 29, such as the cloud-based computing system 28, the industrial automation equipment 16, the control/monitoring device 14, or other components associated with the industrial application 24. For example, in some embodiments, the method 110 may be performed by the lock processor 52. Additionally, although the following method 110 describes a number of operations that may be performed, it should be noted that the method 110 may be performed in a variety of suitable orders and all of the operations may not be performed. It should be appreciated that the method 110 may be wholly executed by the computing device 26 or the execution may be distributed between the computing device 26 and/or the cloud-based computing system 28.

Referring now to the method 110, the processor 36 may receive (block 112) a request to deactivate (e.g., unlock) the locking mechanism 64 of the electronic lock 29 that is currently in a locked state (e.g., preventing the industrial automation equipment 16 from being operational). The request may be received as input from the user, as a signal from the industrial automation equipment 16, the electronic lock 29, the control/monitoring device 14, the cloud-based computing system 28, other industrial automation equipment located in the facility, or the like. The processor 36 may determine (block 114) whether the user associated with the request is authorized to place the industrial automation equipment 16 online based on credentials of the user. For example, the processor 36 may prompt the user to enter an employee identification number, a username, or the like and an associated password, and then verify the credentials in a database to determine the access rights associated with the credentials. In some embodiments, the processor 36 may use single sign-on (SSO) and already possess the credentials from when the user entered them by initially logging into the software. Also, the processor 36 may have remembered the credentials of the user, thereby skipping over prompting the user for the credentials. If the credentials of the user do not have sufficient access rights to place the industrial automation equipment 16 online, then the processor 36 may deny the request and not decrement the authorized user count, discussed above in FIG. 7.

When the credentials of the user have sufficient access rights to place the industrial automation equipment 16 online, then the processor 36 may decrement (block 116) the authorized user count. In some embodiments, the processor 36 may check the actuation state (e.g., locked or unlocked) of the locking mechanism 64 before decrementing the authorized user count. In some embodiments, the processor 36 may not send a deactivation signal until the authorized user count reaches a desired value (e.g., zero). Thus, the processor 36 may receive additional requests to deactivate the electronic lock 29 (shown by dotted line 118) until the authorized user count is decremented to zero. To illustrate, if the authorized user count is set to three, then three requests to deactivate the electronic lock 29 may cause the authorized user count to be decremented to zero. As a result, the processor 36 may send (block 120) a deactivation signal to the electronic lock 29 when the authorized user count is zero.

Technical effects of the embodiments described herein include using an electronic lock 29 that enables virtually tagging and locking industrial automation equipment 16 from a connected device, such as the computing device 26. The software running on the computing device 26 may generate an actuation signal after certain credential and/or status checks are performed. Also, information related to the user who operates the electronic lock 29 and the time at which the lock 29 was operated may be logged (e.g., virtually tagged) by the electronic lock 29. Also, the electronic lock 29 may provide location information to the computing device 26 so the computing device 26 may locate and/or provide directions to the electronic lock 29. Further, the electronic lock 29 may determine when it is being tampered with and perform one or more preventative actions. In addition, displaying tagging information (e.g., identity of technician responsible for locking the electronic lock 29, timestamp of locking the electronic lock 29) using the display 57 on the electronic lock 29 avoids the use of traditional physical tags. Although the above system and techniques are described with regard to the industrial application 24, it should be understood that the system and techniques may apply to any industry, such as pharmaceutical, oil and gas, food and beverage, and so forth.

Moreover, although described above with reference to the electronic lock 29 operating as a soft lock that facilitates virtually tagging and locking industrial automation equipment 16, it is to be understood that the present techniques for multi-factor authentication of users, such as operators 140, may also be extended to authorize users to access industrial automation equipment 16 based on a set of user permissives. For example and as discussed in more detail below, the electronic lock 29 may include a multi-factor authentication system that verifies whether a user is authorized to actuate the electronic lock 29 based on whether the user requesting access to the electronic lock 29 matches or is associated with certain conditions that match one or more respective permissive rules that define whether one can access the electronic lock 29. Indeed, one or more permissives databases may be maintained within the cloud-based computing system 28 so that the electronic lock 29 may verify that one or more users requesting to actuate the electronic lock 29 are authorized to access the industrial automation equipment 16 in its current operating condition, at the current time, with his credentials, and so forth. As used herein, the electronic lock 29 may be implemented within the industrial application 24 to secure an enclosure disposed around the industrial automation equipment 16, attached to the industrial automation equipment 16 directly to control an access the industrial automation equipment 16, or the like. In addition, the permissives databases may enable the electronic lock 29 to dynamically change the expected inputs to actuate the electronic lock 29. That is, the permissives that indicate when the electronic lock 29 is accessible may change dynamically based on time, operating parameters of the industrial automation equipment, weather, and the like.

Figure 12:
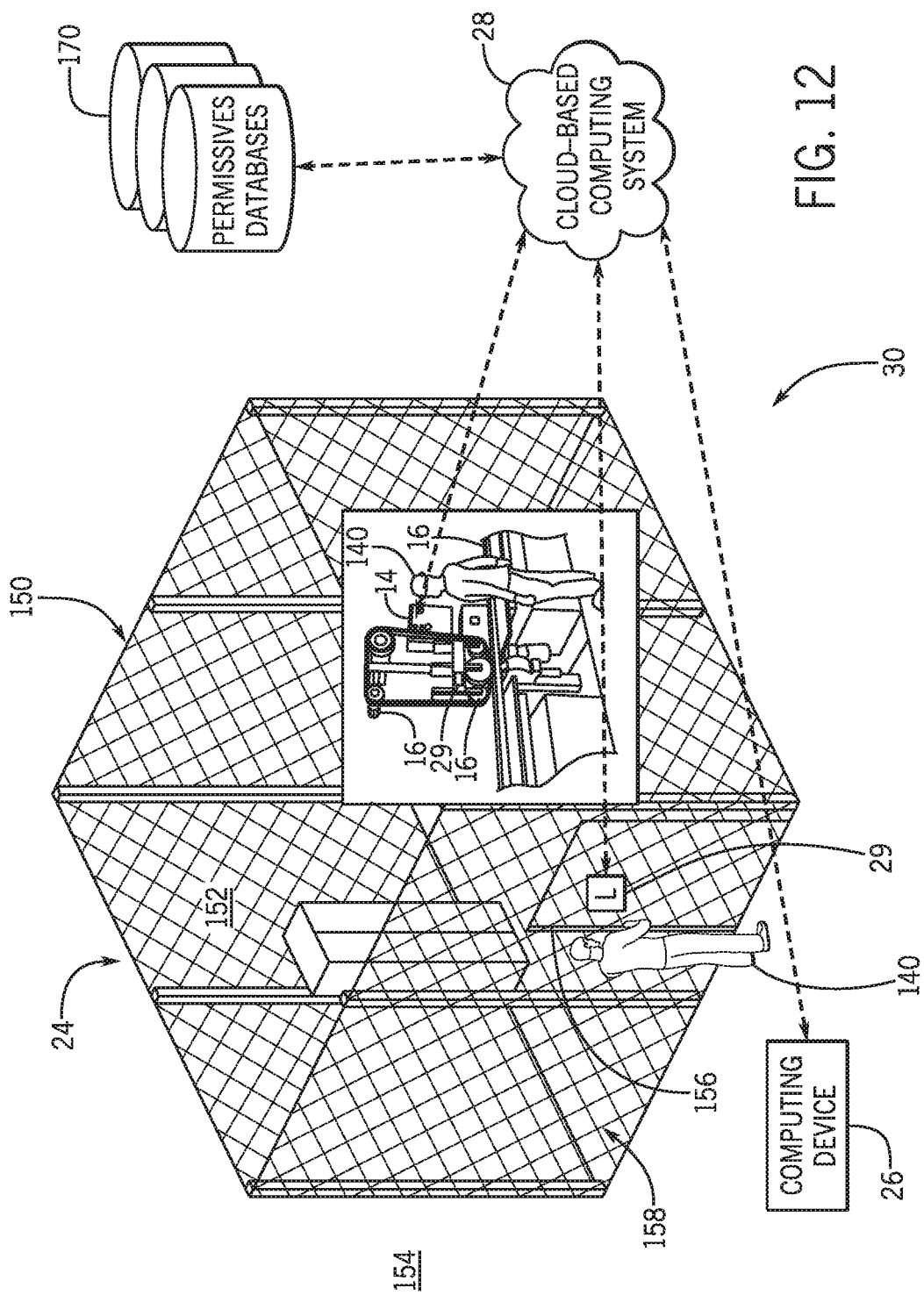
FIG. 12 is a schematic representation of a multi-factor authentication system, in accordance with embodiments presented herein.

By way of an example, FIG. 12 is a schematic representation of an example arrangement of the electronic lock 29 used to control access to an enclosure 150, in accordance with embodiments presented herein. The enclosure 150 may be a perimeter enclosure that encloses the industrial automation equipment 16. More particularly, the enclosure 150 may enshroud extents of potential movement of the industrial automation equipment 16 in three dimensions so as to physically separate an interior 152 of the enclosure 150 from an exterior 154 of the enclosure 150. To facilitate maintenance, service, trainings, and so forth of the industrial automation equipment 16, an access door 156 may be formed within a wall 158 of the enclosure 150 to enable personnel or users, such as one or more operators 140, to enter the enclosure 150.

As discussed herein, in one embodiment, access to the enclosure 150 via the via the access door 156 may be controlled by the control/monitoring device 14, which may send command signals to the electronic lock 29 to actuate the electronic lock 29. As illustrated, the control/monitoring device 14 is communicatively coupled with the electronic lock 29 and/or the computing device 26 via the cloud-based computing system 28, as previously discussed with reference to the communication network 30 of FIG. 2. Moreover, although illustrated with the electronic lock 29 disposed on the access door 156 of the enclosure 150, it is to be understood that one or more electronic locks 29 may be disposed in additional or alternative positions, such as on the industrial automation equipment 16, and be able to perform the techniques discussed herein.

By way of operation, the electronic lock 29 may employ a multi-factor authentication system to authorize an operator 140 to actuate the electronic lock 29 based on sensor data and/or operating conditions of the industrial automation equipment 16, in combination with one or more user permissives associated with the operator 140. As used herein, user permissives may include a set of conditions or parameters that indicate when the electronic lock 29 should actuate. The user permissives may be dynamic in nature in that each specified condition or parameter may be based on a time, sensed data, other data, and the like. To maintain the availability of the user permissives for the electronic lock 29, the cloud-based computing system 28 may maintain one or more permissives databases 170 that include user permissives or authorizations associated with each operator 140 of the industrial application 24, identification information associated with each operator 140, and so forth.

Indeed, as briefly mentioned above, the user permissives stored within the one or more permissives databases 170 may generally describe individual conditions in which the operator 140 is authorized to actuate the electronic lock 29. In some embodiments, the electronic lock 29 may also combine the individual conditions set forth by the user permissives to authorize the operator 140 for access. By way of example, the user permissives analyzed by the electronic lock 29 may include a list of particular enclosures 150 that the operator is authorized to access, a list of particular components of the industrial automation equipment 16 that the operator 140 is authorized to access, a list of times or shifts that the operator 140 is authorized for access, a list of operating conditions (e.g., low speed, low power, off) of the industrial automation equipment 16 during which the operator 140 is authorized for access, and so forth.

Additionally, the user permissives may describe whether the operator 140 is authorized for independent access to the enclosure 150, or alternatively, whether a peer or supervising operator is to accompany the operator 140 and/or manually approve actuation requests made by the operator 140, such as under conditions in which the operator 140 is in training. Further, if multiple operators 140 request to access the enclosure 150, the electronic lock 29 may rank the requesting operators 140 based on their respective user credentials, and control the access of each operator 140 based on the ranking. Further, the electronic lock 29 may determine whether the actuation request made by the operator 140 is suspicious based on a record of access or actuation requests made by the operator 140, and transmit alerts or perform any other suitable action in response to determining that the current actuation request is suspicious. It is to be understood that these non-limiting examples may also be considered in combination with one another, such that the electronic lock 29 may authorize users that meet more than one, a threshold number, or any suitable quantity of a set of expected user permissives. Based on the user permissives of each operator 140, the electronic lock 29 may enable each operator 140 may access the enclosure 150, the industrial automation equipment 16, and/or industrial application 24 in a personalized, conditional, and machine-specific manner.

Figure 13:
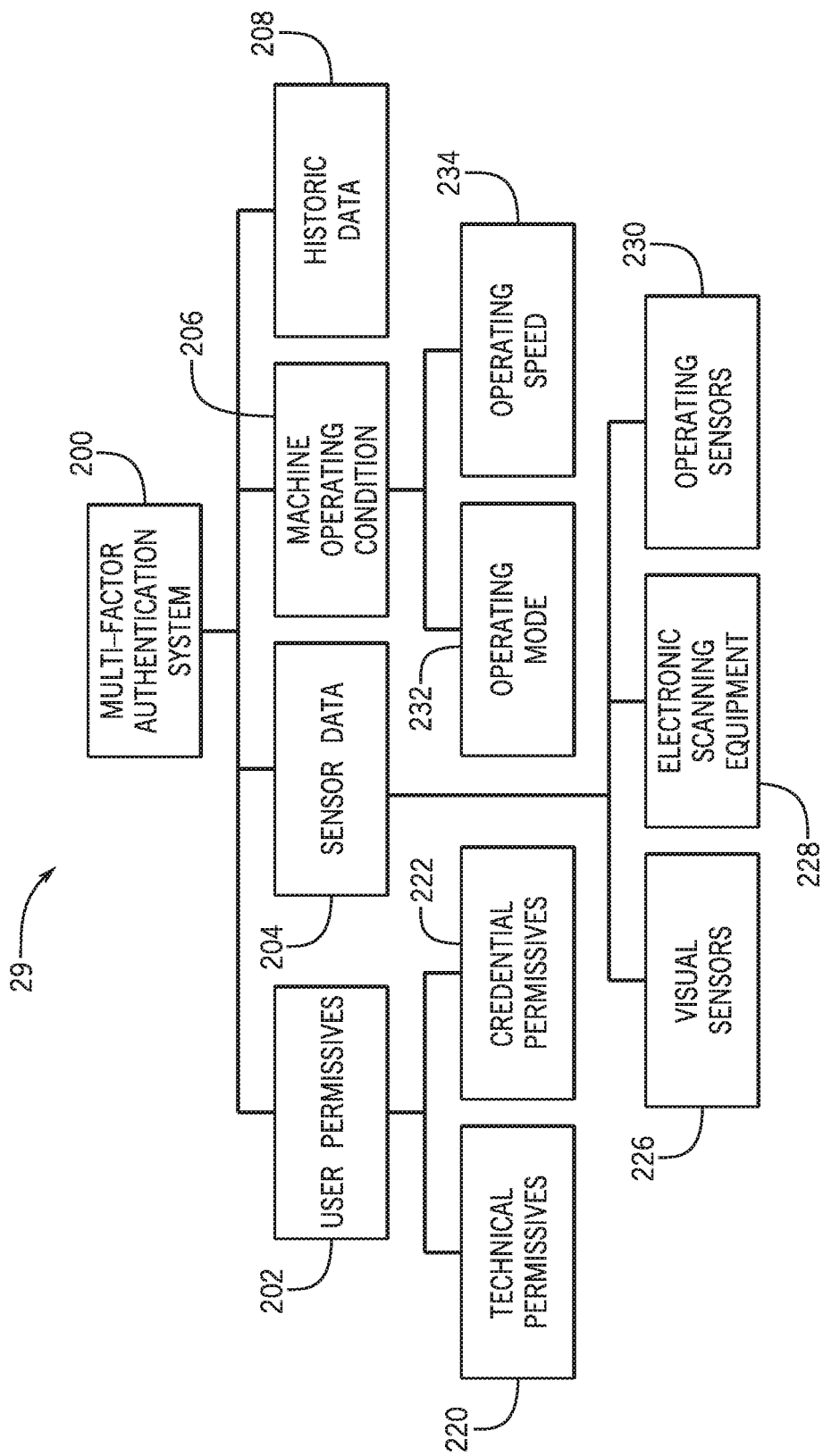
FIG. 13 is a block diagram of example components of the multi-factor authentication system of FIG. 12 that is part of the communication network of FIG. 2, in accordance with embodiments presented herein.

FIG. 13 is an example diagram illustrating sample parts of a multi-factor authentication system 200 that may be organized and implemented with respect to the electronic lock 29 of FIG. 12, in accordance with embodiments presented herein. As discussed above, the multi-factor authentication system 200 may provide a structure or framework to authenticate an access request from an operator 140 for entering the enclosure 150 in response to a set of user permissives associated with the operator 140 requesting access matching an expected set of user permissives. For example, the multi-factor authentication system 200 may collect, receive, or include user permissives 202, as well as sensor data 204, machine operating conditions 206, and historic data 208 that collectively describe a current status of the industrial application 24. In some embodiments, the electronic lock 29 may employ the multi-factor authentication system 200 to determine whether the requesting operator 140 is authorized for accessing the enclosure 150. As such, the electronic lock 29 may analyze various aspects of the multi-factor authentication system 200 to determine whether to actuate in response to an access request that is received from the operator 140. Additionally, in some embodiments, the multi-factor authentication system 200 may be implemented within or distributed across one or more of the cloud-based computing system 28, the computing device 26, and/or the electronic lock 29. Further, data that may be part of the multi-factor authentication system 200 may be stored in the one or more permissives databases 170 communicatively coupled to the cloud-based computing system 28, as discussed above.

Looking more closely to the user permissives 202, the user permissives 202 may generally define permissions or authorizations assigned to each operator 140 that enable each operator 140 to access the various components or industrial automation equipment 16 within the industrial application 24. The user permissives 202 may generally include two categories: technical permissives 220 that describe the technical access for each operator 140 and credential permissives 222 that describe the credential access for each operator 140. For example, the technical permissives 220 for each operator 140 may be stored within the one or more permissives databases 170 and include a list of operating conditions (e.g., off, on, standby, part load, a threshold load, full load, a threshold operating speed, etc.) of the industrial automation equipment 16 during which an operator 140 is authorized to actuate the electronic lock 29, a list of types of the industrial automation equipment 16 that the operator 140 is authorized to access, a list of specific enclosures 150 that the operator 140 is authorized to enter, a list or range of specific times (e.g., 8 am-12 pm, first shift, etc.) that the operator 140 is authorized to access the enclosure 150, and so forth.

Additionally, credential permissives 222 for each operator 140 may be stored within the one or more permissives databases 170 and define authorizations that are based on the competency or skill level of each operator 140. For example, the credential permissives 222 may include a job title of an operator 140 (e.g., technical staff, maintenance engineer, supervising engineer, cleaning staff, etc.), a job function of the operator 140 within the industrial application 24 (e.g., production, management, finance, maintenance, cleaning, etc.), a list of trainings completed by the operator 140, a current employment status of the operator 140, a current certification and/or training status of the operator 140, a comprehension score (e.g., as measured by an examination) of all or a portion of the industrial application 24 by the operator 140, and so forth. Moreover, the credential permissives 222 may enable the electronic lock 29 to determine whether the operator 140 has completed an expected number, expected subset, an expected quota or so forth of certain trainings and/or certifications. As such, the multi-factor authentication system 200 of the electronic lock 29 may access and maintain up-to-date permissives assigned to each operator 140 within the one or more permissives databases 170 to enable the electronic lock 29 to actuate with user-specific granularity that increases a safety factor or reliability of the industrial application 24, compared to industrial applications without the multi-factor authentication system 200.

Looking to other data outlined by the multi-factor authentication system 200, the sensor data 204 may include data from visual sensors 226 and/or data from electronic scanning equipment 228. The visual sensors 226 may include the camera 66 of the electronic lock 29 discussed above, the camera 66 disposed in another suitable location within the industrial application 24 to monitor the enclosure 150 and/or the access door 156, infrared (IR) and/or visual cameras disposed within the industrial application 24, a light curtain, sensors 18 described above, and so forth. Additionally, electronic scanning equipment 228 may include the receiver circuit or radio-frequency identification (RFID) reader described above, a fingerprint scanner, an iris scanner, any suitable biometric scanner, an area scanner, and so forth. Additionally, the electronic scanning equipment 228 may include a light curtain, a pressure mat, and/or a camera (e.g., a 3D time-of-flight (ToF) camera) that detects a physical position of the one or more operators within the industrial application. Based on the sensor data 204, the electronic lock 29 may query the one or more permissives databases 170 to identify the operator 140. As such, any suitable sensor data 204 may be part of the multi-factor authentication system 200 to enable the electronic lock 29 to determine an identity of the operator 140 requesting access to the enclosure 150.

Further, the sensor data 204 may include operating data indicative of the various properties of the industrial automation equipment 16 monitored by the sensors 18 and/or actuators 20 of FIG. 1, hereinafter collectively referred to as operating sensors 230. Indeed, the sensor data from the operating sensors 230 may include any suitable operating data related to the industrial automation equipment 16, including data indicative of operating speeds, operating modes, pressures, temperatures, production rate, and so forth.

Additionally, the multi-factor authentication system 200 may include the machine operating condition 206 associated with the industrial automation equipment 16 within the enclosure 150 that the operator 140 is requesting to access. As used herein, the machine operating condition 206 may include an operating mode 232 and/or an operating speed 234 of each industrial automation equipment 16. The operating mode 232 may be any suitable qualitative description of the operation of the industrial automation equipment 16, such as a full or maximum operating load, a part operating load, a half operating load, a minimum operating mode, standby, tagged out, locked out, offline, and so forth.

Further, the operating speed 234 may be any suitable qualitative description of a speed at which any moveable component of the industrial automation equipment 16 is moving. It is to be understood that the multi-factor authentication system 200 may consider other quantitative conditions of the industrial automation equipment 16 in addition or in alternative to the operating speed 234, such as temperature, pressure, production rate, and so forth. Indeed, any suitable quantitative description may be considered by the multi-factor authentication system 200 disclosed herein. In some embodiments, the multi-factor authentication system 200 may receive the machine operating condition 206 directly from the industrial automation equipment 16 or indirectly though the cloud-based computing system 28 or some other intermediate device.

In some embodiments, the multi-factor authentication system 200 may consider the historic data 208 when determining whether the operator 140 is authorized to actuate the electronic lock 29. The historic data 208 may be stored within any suitable database on the cloud-based computing system 28, such as the one or more permissives databases 170. In some embodiments, the historic data 208 includes previous actuation requests sent to the electronic lock 29, as well as historic values of the user permissives 202, the sensor data 204, and the machine operating condition 206. As such, by comparing the present user permissives 202, sensor data 204, and machine operating conditions 206 to their historic values within the historic data 208, the electronic lock 29 may authenticate actuation of the electronic lock 29 as each actuation request is made.

Figure 14:
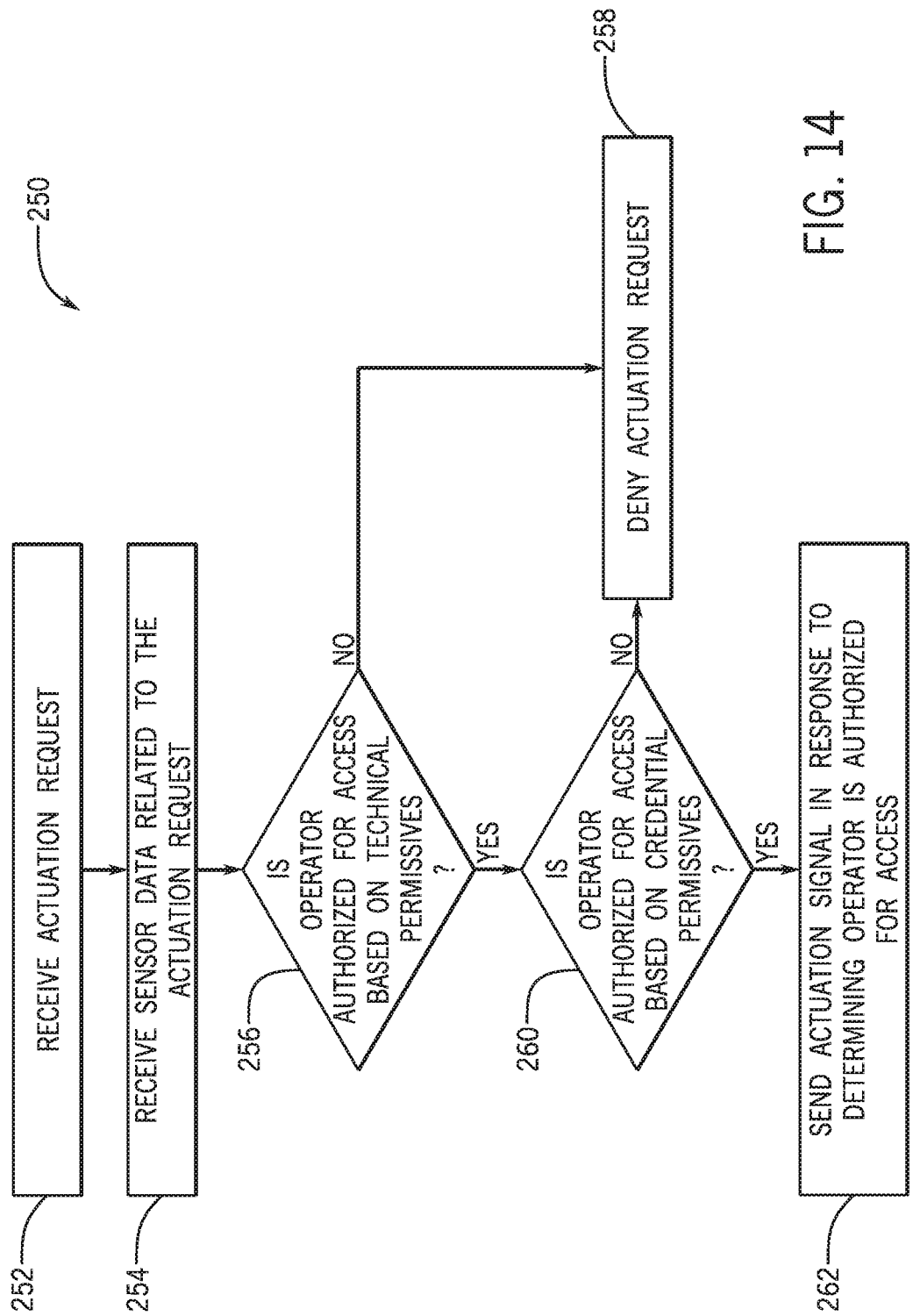
FIG. 14 is a flow diagram of a method for controlling actuation of the electronic lock of FIG. 12, in accordance with embodiments presented herein.

With the above understanding of the components of the multi-factor authentication system 200 in mind, FIG. 14 is a flow diagram of a method 250 for operating the electronic lock 29 of the multi-factor authentication system 200 based on the user permissives 202, in accordance with embodiments presented herein. Although the following description of the method 250 is described with reference to the processor 52 of the electronic lock 29, it should be noted that the method 250 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 250 describes a number of operations that may be performed, it should be noted that the method 250 may be performed in a variety of suitable orders and all of the operations may not be performed. It should be appreciated that the method 250 may be wholly executed by the processor 52 of the electronic lock 29 or the execution may be distributed between the processor 52 of the electronic lock 29, the processor 36 of the computing device 26, or other suitable devices. Moreover, although certain examples of the electronic lock 29 are described with reference to operators 140 requesting to unlock the electronic lock 29 and enter the enclosure 150, it is to be understood that a similar method to the method 250 may be performed with reference to operators 140 requesting to exit the enclosure 150 and lock the electronic lock 29. In such embodiments, the camera, light curtain, pressure mat, and/or any other suitable scanning equipment may be employed to verify that the operators 140 have exited the enclosure 150.

Referring now to the method 250, the processor 52 may receive (block 252) an actuation request to actuate (e.g., lock or unlock) the electronic lock 29. The actuation request may be transmitted from the computing device 26, the cloud-based computing system 28, the control/monitoring device 14, or the like. In some embodiments, the actuation request may include identification information indicative of the operator 140 that is requesting to actuate the electronic lock 29. For example, the identification information may include a user name of the operator 140, a user identification number of the operator 140, an employee number of the operator 140, a phone number associated with of the operator 140, an identification number from the RFID tag associated with the operator 140, and so forth.

The processor 52 may receive (block 254) sensor data 204 related to the actuation request. For example, the processor 52 may receive data from the camera 66 of the electronic lock 29 to enable the processor 52 to utilize a facial recognition software to verify the identity of the operator 140. Additionally, the processor 52 may receive data indicative of the machine operating condition 206 of the industrial automation equipment 16 directly from the industrial automation equipment 16 and/or indirectly from the cloud-based computing system 28. The machine operating condition 206 may include the operating mode 232 of the industrial automation equipment 16 and/or the operating speed 234 of the industrial automation equipment 16, as well as, for example, an operating load of the industrial automation equipment 16, a temperature of the industrial automation equipment 16, a pressure of the industrial automation equipment 16, a product being produced by the industrial automation equipment 16, and so forth. Additionally, as noted above, the processor 52 may also receive and analyze signals from a light curtain and/or a pressure mat to determine whether the operator 140 is standing within a threshold distance from a target location, such as a location in proximity or in front of the electronic lock 29. For example, the processor 52 may receive an operating mode 232 from the industrial automation equipment 16 indicating that the industrial automation equipment 16 is operating at a certain speed corresponding to a part load of the industrial automation equipment 16. The processor 52 may also receive, or determine, a current time at which the actuation request was received.

The processor 52 may determine (block 256) if the operator 140 is authorized to for access to the enclosure 150 based on the technical permissives 220 associated with the operator 140. For example, the operator 140 may be authorized to actuate the electronic lock 29 to enter the enclosure 150 when each industrial automation equipment 16 within the enclosure 150 is operating at or below a threshold operating speed. That is, the operator 140 may be permitted to enter the enclosure 150 when each industrial automation equipment 16 within the enclosure 150 is turned off or stationary.

If the processor 52 determines that the operator 140 is not authorized based on the technical permissives 220, such as if the operating speed 234 of the industrial automation equipment 16 is not within the range specified by the technical permissives 220 associated with the operator 140, or if the operator 140 is not standing in a target position, the processor 52 denies (block 258) the actuation request. In some embodiments, after or in response to denying the actuation request, the processor 52 may store a data point indicative of the actuation request within the one or more permissives databases 170. Additionally, in some embodiments, the processor 52 may block actuation requests from the operator 140 for a threshold time after the denied request, transmit an alert indicate of the denied request, and so forth, If the operator 140 is authorized for access based on the technical permissives 220, the processor 52 may also determine (block 260) if the operator 140 is authorized for access to the enclosure 150 based on the credential permissives 222 associated with the operator 140. For example, the operator 140 may be authorized to actuate the electronic lock 29 to enter the enclosure 150 if the operator 140 has completed a threshold number or threshold subset of trainings associated with the industrial automation equipment 16 within the enclosure 150. Additionally, the operator 140 may be authorized to actuate the electronic lock during times that the operator 140 is checked in for a shift at the industrial application 24. If the processor 52 determines that the operator 140 does not have the specific credential permissives 222 to actuate the electronic lock 29, the processor 52 denies (block 258) the actuation request.

In response to determining that the operator 140 is authorized for access based on both the technical permissives 220 and the credential permissives 222, the processor 52 may send (block 262) the actuation signal to components or actuators of the electronic lock 29 to lock or unlock the electronic lock 29 based on the actuation request by the operator 140. As such, the electronic lock 29 may implement the multi-factor authentication system 200 to authenticate operation of the electronic lock 29 based on the operator 140 meeting a plurality of specifications, thereby providing additional layers of security to operator access to the industrial automation equipment 16 within the enclosure 150. Moreover, by employing the method 250, the electronic lock 29 may provide access to different operators 140 at different times, at different operating conditions 206, and the like. Indeed, the electronic lock 29 may dynamically control access to the industrial automation equipment 16 based on various conditions of the industrial automation equipment 16 and properties of the operator 140 as provided in the permissives databases 170. Additional examples and combinations of the various user permissives 202 that the processor 52 may authenticate before actuating the electronic lock 29 are discussed below.

Figure 15:
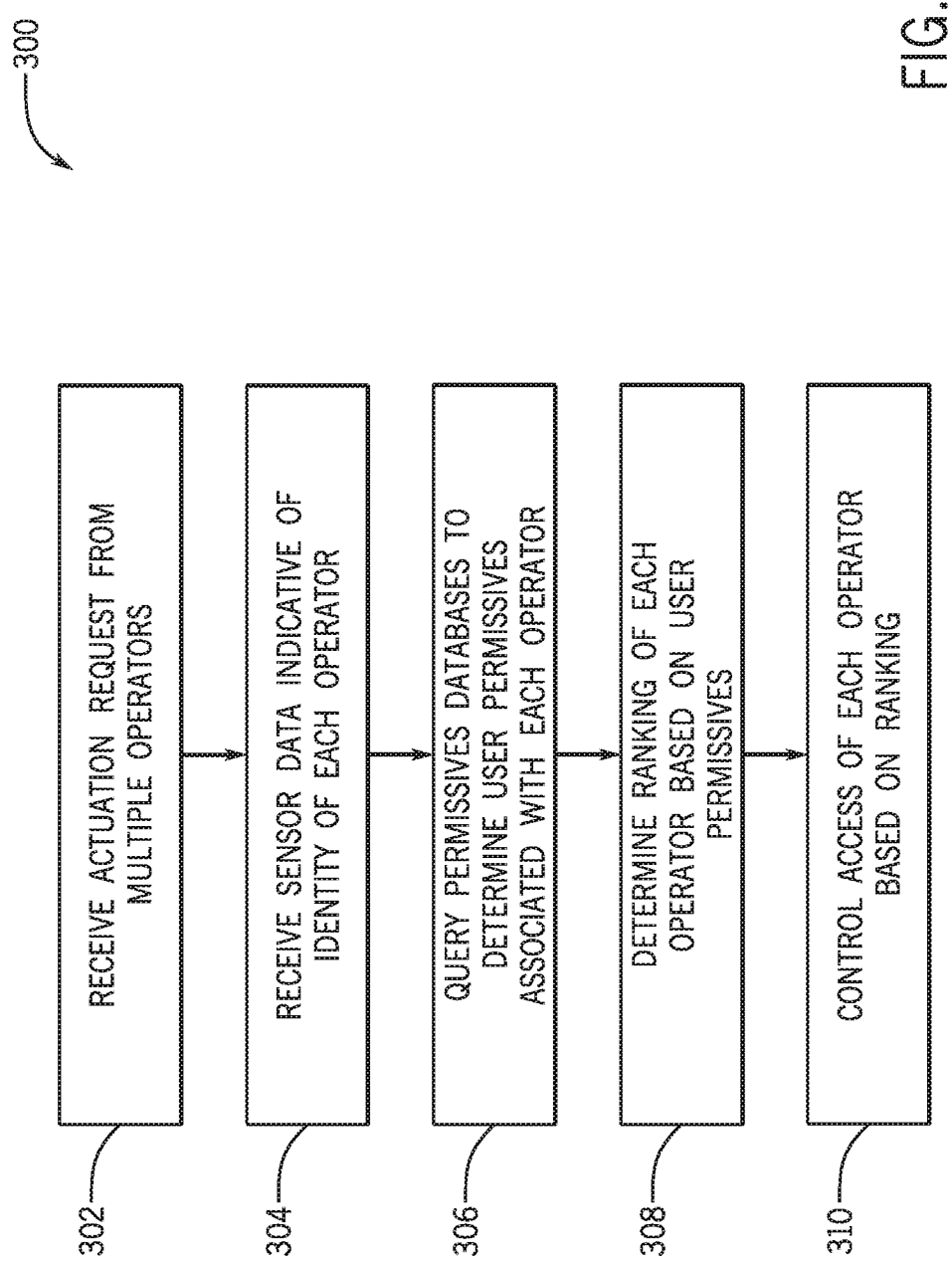
FIG. 15 is a flow diagram of a method for controlling actuation of the electronic lock of FIG. 12 based on permissives associated with multiple operators, in accordance with embodiments presented herein.

FIG. 15 is a flow diagram of a method 300 for modulating control of the electronic lock 29 of FIG. 6 for multiple operators, in accordance with embodiments presented herein. Although the following description of the method 300 is described with reference to the processor 52 of the electronic lock 29, it should be noted that the method 300 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 300 describes a number of operations that may be performed, it should be noted that the method 300 may be performed in a variety of suitable orders and all of the operations may not be performed. It should be appreciated that the method 300 may be wholly executed by the electronic lock 29 or the execution may be distributed between the electronic lock 29, the computing device 26, or other suitable devices. Moreover, although certain examples of the electronic lock 29 are described with reference to operators 140 requesting to unlock the electronic lock 29 and enter the enclosure 150, it is to be understood that a similar method to the method 300 may be performed with reference to operators 140 requesting to exit the enclosure 150 and lock the electronic lock 29.

Referring now to the method 300, the processor 52 may receive (block 302) an actuation request to lock or unlock the electronic lock 29 from multiple operators 140. The actuation request may be transmitted to the processor 52 from the computing device 26, the cloud-based computing system 28, the control/monitoring device 14, or the like, as discussed above with reference to block 252. Additionally, each operator 140 may individually request actuation of the electronic lock 29 via their respective computing devices 26 or by providing information to the electronic lock 29 and/or the cloud-based computing system 28. In some embodiments, the processor 52 may verify that the actuation requests are each received within a threshold time of one another, thus confirming that the operators 140 are requesting access to the enclosure 150 as a group, instead of as individual operators 140.

The processor 52 may also receive (block 304) sensor data 204 indicative of an identity and/or location of each operator 140 that requests to actuate the electronic lock 29. By way of example, if two operators 140 request to actuate the electronic lock 29 to enter the enclosure 150, each operator 140 may request to actuate the electronic lock 29 from their respective computing devices 26. The operators 140 may send the sensor data 204 indicative of their identity to the processor 52 of the electronic lock 29 by scanning respective RFID tags, scanning respective bar codes, entering respective codes on a keypad, being visualized by the camera 66, and so forth. In some embodiments, the actuation request received at block 302 may include the sensor data 204 indicative of the identity of each operator 140, such that block 302 and block 304 are performed simultaneously (i.e., within a threshold time of one another).

After receiving the sensor data 204 indicative of which operators 140 are requesting to actuate the electronic lock 29, the processor 52 may query (block 306) the one or more permissives databases 170 based on the identification information provided to the processor 52 to determine the technical permissives 220 and credential permissives 222 associated with each operator 140. That is, because the one or more permissives databases 170 may be organized with respect to the identification information and the user permissives 202, the processor 52 may efficiently retrieve the user permissives 202 including the technical permissives 220 and the credential permissives 222 for each requesting operator 140 with respect to the electronic lock 29 and the industrial automation equipment 16 secured by the electronic lock 29.

With the user permissives 202 now available, the processor 52 may determine (block 308) a ranking of each operator 140 of the group of operators 140 based on the respective user permissives 202 of each operator 140. That is, in general, the processor 52 may assign different class rankings to each operator 140, ordered based on a level of access each operator 140 is provided to actuate the electronic lock 29. In such cases, for example, a vice president may be assigned a higher ranking than a supervisor, who may be assigned a higher ranking than a technician. Additionally, in some embodiments, the processor 52 may individually assess and rank the individual user permissives 202 associated with each operator 140. For example, the processor 52 may identify that a first operator 140 has user permissives 202 that indicate the first operator 140 is employed as a maintenance technician, while a second operator 140 has user permissives 202 that indicate the second operator 140 is employed as a cleaning personnel. Because the maintenance technician is provided greater access to the enclosure 150 (e.g., during a larger time period, during a greater range of operating conditions 204 of the industrial automation equipment) than the cleaning personnel, the maintenance technician may be given a greater rank than the cleaning personnel. Based on the level of access provided to the operators 140 according to the user permissives 202, the processor 52 may rank the first operator 140 at a higher level as compared to the second operator 140. In some embodiments, the processor 52 may provide a greater ranking to operators 140 that are suitably qualified to access the industrial automation equipment 16 in its current operating condition 204 than a ranking provided to unqualified operators 140 that are not qualified to access the industrial automation equipment 16 based on the various components of the user permissives 202 associated with the unqualified operators 140.

Moreover, in some embodiments, the processor 52 may additionally or alternatively determine a ranking for each operator 140 based on a respective work order or task assigned to each operator 140 requesting to access the enclosure 150. The work order may include any suitable instructions that the operator 140 is to complete. For example, a first operator 140 assigned to complete a first work order may be given a higher ranking than a second operator 140 assigned to complete a second work order if the first work order was received or retrieved before the second work order, if the first work order is associated with a particularly high-importance procedure (e.g., line stoppages, lockout-tagout procedures), and so forth.

Further, the processor 52 may control (block 310) access of each operator 140 based on the ranking determined at block 308. That is, the processor 52 may provide an opportunity for each operator 140 to actuate the electronic lock 29 according to an order determined based on the respective rankings of each operator 140. As such, the processor 52 may block the actuation request of the operator 140 having the lowest ranking. In some embodiments, after denying an actuation request, the processor 52 may enable a subset of the operators 140 having higher rankings the ability to actuate the electronic lock 29 if the respective operators 140 are authorized for the current time, current operating condition 206 of the industrial automation equipment 16, and so forth. The lower ranking operators 140 submit an additional actuation request, which the processor 52 may authenticate if the user permissives 202 of operators 140 that already have access to the enclosure 150 indicate that the other operator 140 may also have access with a corresponding expected set of user permissives 202. In this manner, the electronic lock 29 implemented with respect to the multi-factor authentication system 200 may limit access of the operators 140 who have robust access to the enclosure 150 to the lower access level allotted to operators 140 with comparatively restricted user permissives 202, thereby blocking the electronic lock 29 from actuating in response to group actuation requests including requests by operators 140 to access enclosures 150 for which their respective user permissives 202 do not presently allow.

Figure 16:
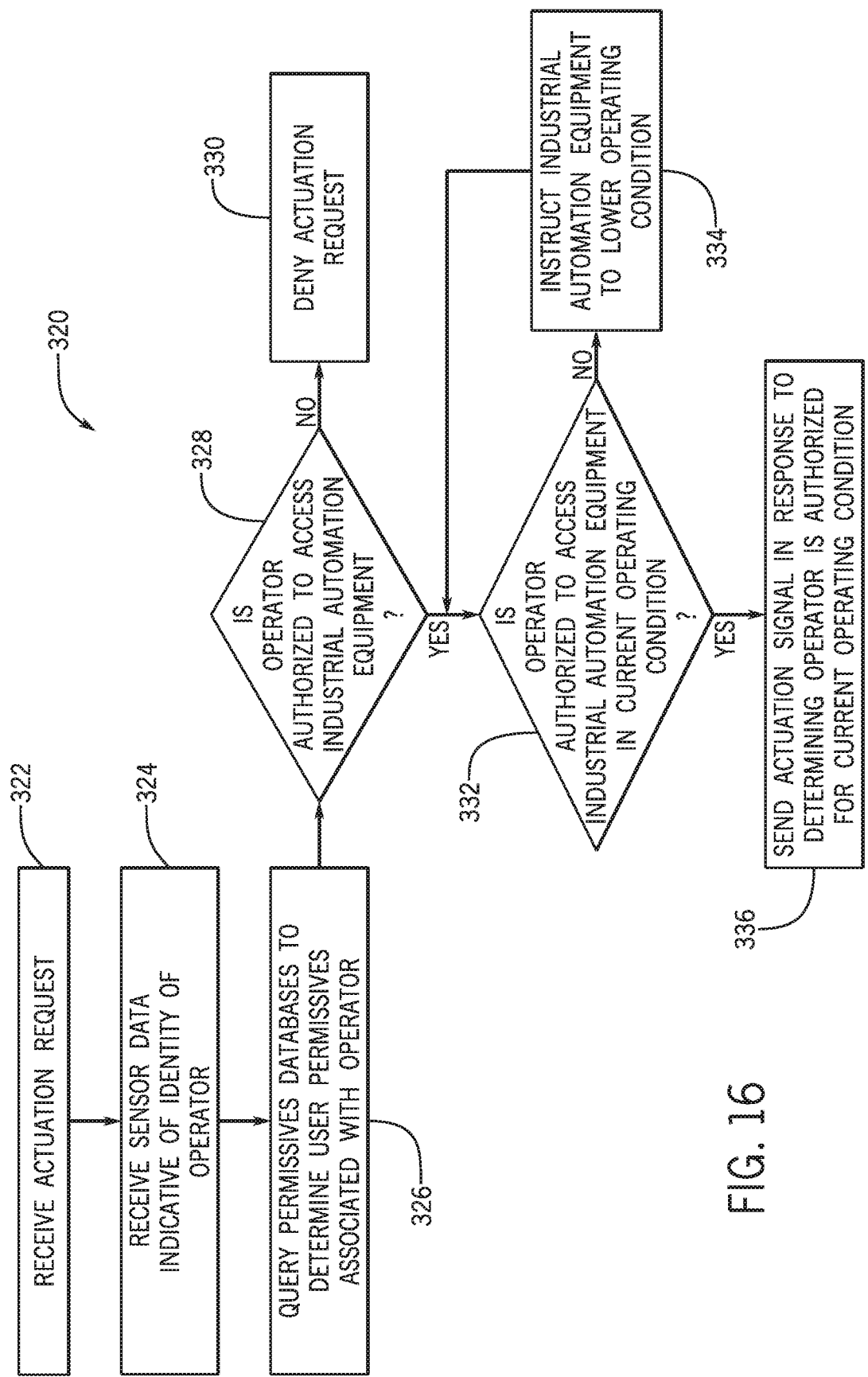
FIG. 16 is a flow diagram of a method for controlling actuation of the electronic lock of FIG. 12 based on an operating condition of industrial automation equipment, in accordance with embodiments presented herein.

FIG. 16 is a flow diagram of a method 320 for controlling the operating condition 206 of the industrial automation equipment 16 based on the user permissives 202 of the operator 140 requesting actuation of the electronic lock 29 of FIG. 6, in accordance with embodiments presented herein. Although the following description of the method 320 is described with reference to the processor 52 of the electronic lock 29, it should be noted that the method 320 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 320 describes a number of operations that may be performed, it should be noted that the method 320 may be performed in a variety of suitable orders and all of the operations may not be performed. It should be appreciated that the method 300 may be wholly executed by the electronic lock 29 or the execution may be distributed between the electronic lock 29, the computing device 26, or other suitable devices. Moreover, although certain examples of the electronic lock 29 are described with reference to operators 140 requesting to unlock the electronic lock 29 and enter the enclosure 150, it is to be understood that a similar method to the method 320 may be performed with reference to operators 140 requesting to exit the enclosure 150 and lock the electronic lock 29.

Referring now to the method 320, the processor 52 may receive (block 322) an actuation request to lock or unlock the electronic lock 29 from an operator 140. Similar to block 302 discussed above, the operator 140 may transmit the actuation request to the processor 52 from the computing device 26, the cloud-based computing system 28, the control/monitoring device 14, or the like. Additionally, the processor 52 may receive (block 324) sensor data 204 indicative of an identity of the operator 140. For example, the processor 52 may receive the sensor data 204 indicative of the identity and/or physical location of the operator 140 via the visual sensors 226, the electronic scanning equipment 228, and so forth. As such, the operator 140 may send the sensor data 204 including identification data indicative of his identity to the processor 52 of the electronic lock 29 by scanning a respective RFID tag, scanning a respective bar codes, entering respective codes on a keypad, being visualized by the camera 66, and so forth, as discussed above with reference to block 304.

Based on the received actuation request and the received sensor data 204, the processor 52 may query (block 326) the one or more permissives databases 170 to determine the user permissives 202 associated with the operator 140. Indeed, as discussed above with reference to block 306, the user permissives 202 organized within the one or more permissives databases 170 may include the technical permissives 220 and credential permissives 222 discussed above.

Thus, based on the user permissives 202 associated with the operator 140, the processor 52 may determine (block 328) whether the operator 140 is authorized to access the industrial automation equipment 16. For example, similar to the determinations of block 260 and block 262, the processor 52 may determine that the operator 140 is authorized to access the industrial automation equipment 16 when the operator 140 meets a number of specifications set forth regarding the operator's 140 specific technical permissives 220 and credential permissives 222 associated with the operator 140.

In response to determining that the operator 140 is not authorized to access the industrial automation equipment 16, the processor 52 may proceed to deny (block 330) the actuation request, as described above with reference to block 258. For example, the actuation request may be denied if the operator 140 is requesting access to the enclosure 150 during a time period for which he is not authorized, regardless of the current operating condition 206 of the industrial automation equipment 16 within the enclosure 150. In another example, the actuation request may be denied if the operator 140 is requesting access to the enclosure 150 while positioned in a location that does not correspond to a location specified in the user permissives 202.

In response to determining that the operator 140 is authorized to access the industrial automation equipment 16, the processor 52 may proceed to determine (block 332) whether the operator 140 is authorized to access the industrial automation equipment 16 in its current operating condition 206. For example, the processor 52 may receive the current operating condition 206 from the industrial automation equipment 16, the sensors 18, the actuators 20, the computing device 26, the cloud-based computing system 28, and so forth.

If the processor 52 determines that the operator 140 is not authorized to access the industrial automation equipment 16 in its current operating condition 206, then the processor 52 may instruct (block 334) the industrial automation equipment 16 to lower its current operating condition 206. In some embodiments, the processor 52 may instruct the industrial automation equipment 16 to lower its operating condition 206 to an operating condition 206 that the operator 140 is permitted to access. For example, the industrial automation equipment 16 may turn off, slow down, draw less power, or so forth in response to the instruction from the processor 52. In some embodiments, the processor 52 may decrement the operating condition 206 of the industrial automation equipment by one step or level of a number of pre-defined operating levels at block 344.

As illustrated, the processor 52 may then return to determine (block 332) whether the operator 140 is authorized to access the industrial automation equipment 16 in its current operating condition 206. In this manner, regardless of how the operating condition 206 of the industrial automation equipment 16 is decremented or reduced, the processor 52 performing the method 320 verifies that the operator 140 is certified or authorized to access the industrial automation equipment 16 in its new operating condition 206 before granting access.

In response to determining that the operator 140 is authorized for the current operating condition 206 of the industrial automation equipment 16 according to the user permissives 202, the processor 52 may send (block 336) the actuation signal to components or actuators of the electronic lock 29 to lock or unlock the electronic lock 29 based on the actuation request by the operator 140. Thus, the electronic lock 29 may be actuated to a requested open or closed position to enable the operator 140 to enter the enclosure 150 and access the industrial automation equipment 16, as discussed above with reference to block 262. Accordingly, the processor 52 implementing the method 320 may first verify that the operator 140 is generally permitted to access the industrial automation equipment 16 before decrementing or changing the operating condition 206 of the industrial automation equipment 16, thus improving an amount of time that the industrial application 24 may be operated normally, compared to conditions in which the presence of an unauthorized operator causes the industrial automation equipment 16 to slow or stop.

Figure 17:
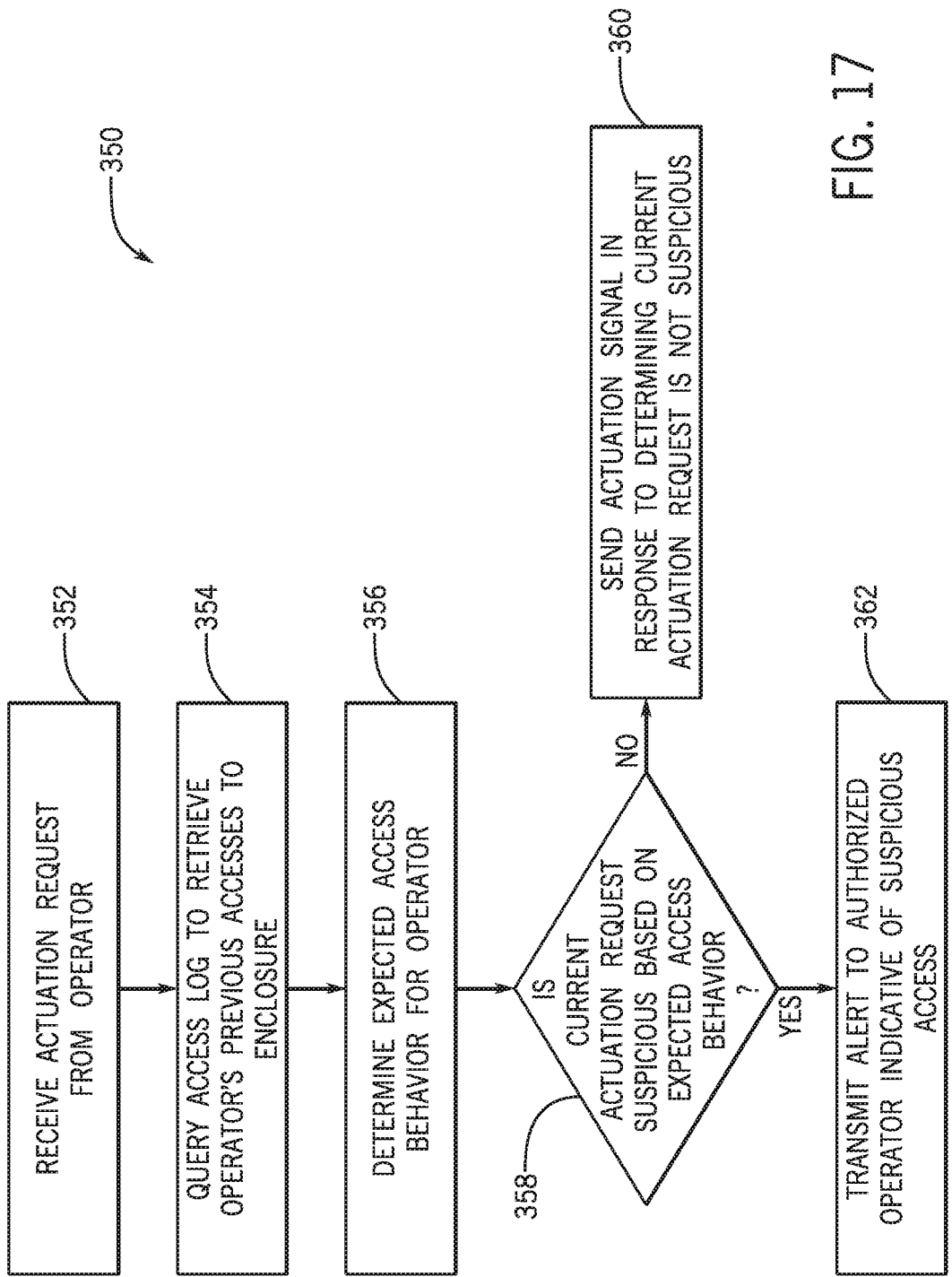
FIG. 17 is a flow diagram of a method for controlling actuation of the electronic lock of FIG. 12 based on whether a current actuation request is suspicious, in accordance with embodiments presented herein.

FIG. 17 is a flow diagram of a method 350 for detecting suspicious actuation of the electronic lock 29 of FIG. 6, in accordance with embodiments presented herein. Although the following description of the method 350 is described with reference to the processor 52 of the electronic lock 29, it should be noted that the method 350 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 350 describes a number of operations that may be performed, it should be noted that the method 350 may be performed in a variety of suitable orders and all of the operations may not be performed. It should be appreciated that the method 350 may be wholly executed by the electronic lock 29 or the execution may be distributed between the electronic lock 29, the computing device 26, or other suitable devices. Moreover, although certain examples of the electronic lock 29 are described with reference to operators 140 requesting to unlock the electronic lock 29 and enter the enclosure 150, it is to be understood that a similar method to the method 350 may be performed with reference to operators 140 requesting to exit the enclosure 150 and lock the electronic lock 29.

Referring now to the method 350, the processor 52 may receive (block 352) an actuation request from the operator 140 to lock or unlock the electronic lock 29. Indeed, as noted above with reference to block 322, the operator 140 may transmit the actuation request to the processor 52 from the computing device 26, the cloud-based computing system 28, the control/monitoring device 14, or the like. The actuation request may include identification information and/or location information regarding the operator 140 in some embodiments. For example, if the actuation request is made from the computing device 26 associated with the operator 140, the processor 52 may receive the actuation request and simultaneously identify the operator 140 based on the association between the operator 140 and the computing device 26. However, as discussed above with reference to block 324, the operator may independently or separately provide the actuation request and the identification information as sensor data 204 indicative of an identity of the operator 140 in some embodiments.

Based on the received actuation request and the identified operator 140, the processor 52 may query (block 354) an access log or log of users stored within the cloud-based computing system 28 to retrieve a list of previous accesses of the operator 140 to the enclosure 150. In general, the access log may be a record of entrance and/or exit times to the enclosure 150, operations performed to the industrial automation equipment 16, movements and/or positions of the operator 140 within the enclosure 150 (e.g., as recorded by one or more pressure sensors, pressure mats, the camera 66, etc.), and other properties associated with the access of the operator 140 to the enclosure 150. The access log may be maintained within the one or more permissives databases 170, as an aspect of the historic data 208 of the multi-factor authentication system 200, and so forth.

The processor 52 may also determine (block 356) an expected access behavior for the operator 140 based on the data stored within the access log. For example, the expected access behavior may set forth an expected time range for the operator 140 to make access requests, an expected frequency of access requests, an expected order in which multiple enclosures 150 are to be accessed, and so forth. In some embodiments, one or more aspects of the expected access behavior, such as the expected time range, is set as an average or range of the previous accesses to the enclosure 150, continuously updated as more accesses are performed, determined via machine learning, determined via artificial intelligence, and/or any suitable combination of these or other suitable determining processes.

By way of example, the processor 52 may analyze the access log with respect to each operator 140 to identify patterns present the access log. Through supervised machine learning algorithms, certain patterns may be categorized as expected behavior. Alternatively, through unsupervised machine learning algorithms, the patterns may be identified and the processor 52 may analyze the whether the current access request corresponds to any detected pattern.

In any case, the processor 52 may then determine (block 358) whether the current actuation request is suspicious or non-expected based on the expected access behavior. For example, the access request may be suspicious if the operator 140 has not made an access attempt to this enclosure 150 at the present time, within a threshold amount of work days, without a certain accompanying operator 140, with a new form of identification information, without previously performing certain steps, and/or any other suitable characteristics. In some embodiments, the processor 52 may determine that the access request is suspicious if the operator 140 has exceeded a threshold number of access requests to the present electronic lock 29, to multiple electronic locks 29, and so forth. The threshold number of access requests may be individually tailored for each operator 140 based on their user permissives 202. In some embodiments, the threshold number of access requests may be set as a daily or monthly average number of access attempts to the electronic lock 29 made by the operator 140, such as 1 access attempt, 5 access attempts, 10 access attempts, and so forth.

Moreover, the processor 52 may determine whether the current actuation request is suspicious in response to signals from the camera 66 of the electronic lock 29 or any other suitable camera or recording device capable of collecting sensor data outside and/or inside the enclosure 150. For example, if one actuation request is received from one operator 140, but image data from a camera indicates that two or more operators 140 are in front of the electronic lock 29, the processor 52 may determine that the access request is suspicious. In certain embodiments in which the interior of the enclosure 150 is monitored (e.g. by a camera, a light curtain, or a pressure mat), the processor 52 may verify whether the number of operators 140 that requested access to the enclosure 150 corresponds to the number of operators 140 that are within the enclosure 150 to determine whether the current access request is suspicious. The processor 52 may then perform any suitable control action in response to the expected access request not matching the current access request. Accordingly, the processor 52 may monitor the enclosure 150 to reduce or mitigate "tailgating" of unauthorized operators 140 into the enclosure 150 during an access requested by an authorized operator 140.

In response to determining that the current actuation request is not suspicious, the processor 52 may send (block 360) a signal to actuate the electronic lock 29. Indeed, as discussed above with reference to block 262, the processor 52 may therefore cause the electronic lock 29 to actuate according to the actuation request by the operator 140. As such, the processor 52 performing the method 350 enables the operator 140 to access the industrial automation equipment 16 if the actuation request is to unlock the electronic lock 29 or enables the operator 140 to lock the electronic lock 29 if the actuation request is to lock the electronic lock 29.

In response to determining that the current actuation request is suspicious, the processor 52 may transmit (block 362) an alert to an authorized operator or supervisor indicative of the suspicious access. As such, the processor 52 may provide information related to the suspicious access that enables the authorized operator to address the suspicious access. In some embodiments, the alert transmitted to the authorized operator may be used by the authorized operator to verify the suspicious access. In such cases, the authorized operator may provide user input to a computing device 26 associated with the authorized operator to instruct the electronic lock 29 to actuate or to remain unactuated in response to the actuation request made by the operator 140. The processor 52 may also perform any other suitable control action in response to the suspicious access, such as setting off an alarm, slowing or stopping operation of the industrial automation equipment 16, and so forth. Moreover, as discussed below, integration of the authorized operator into the authentication of the actuation requests may be performed more directly or routinely, in some embodiments.

Figure 18:
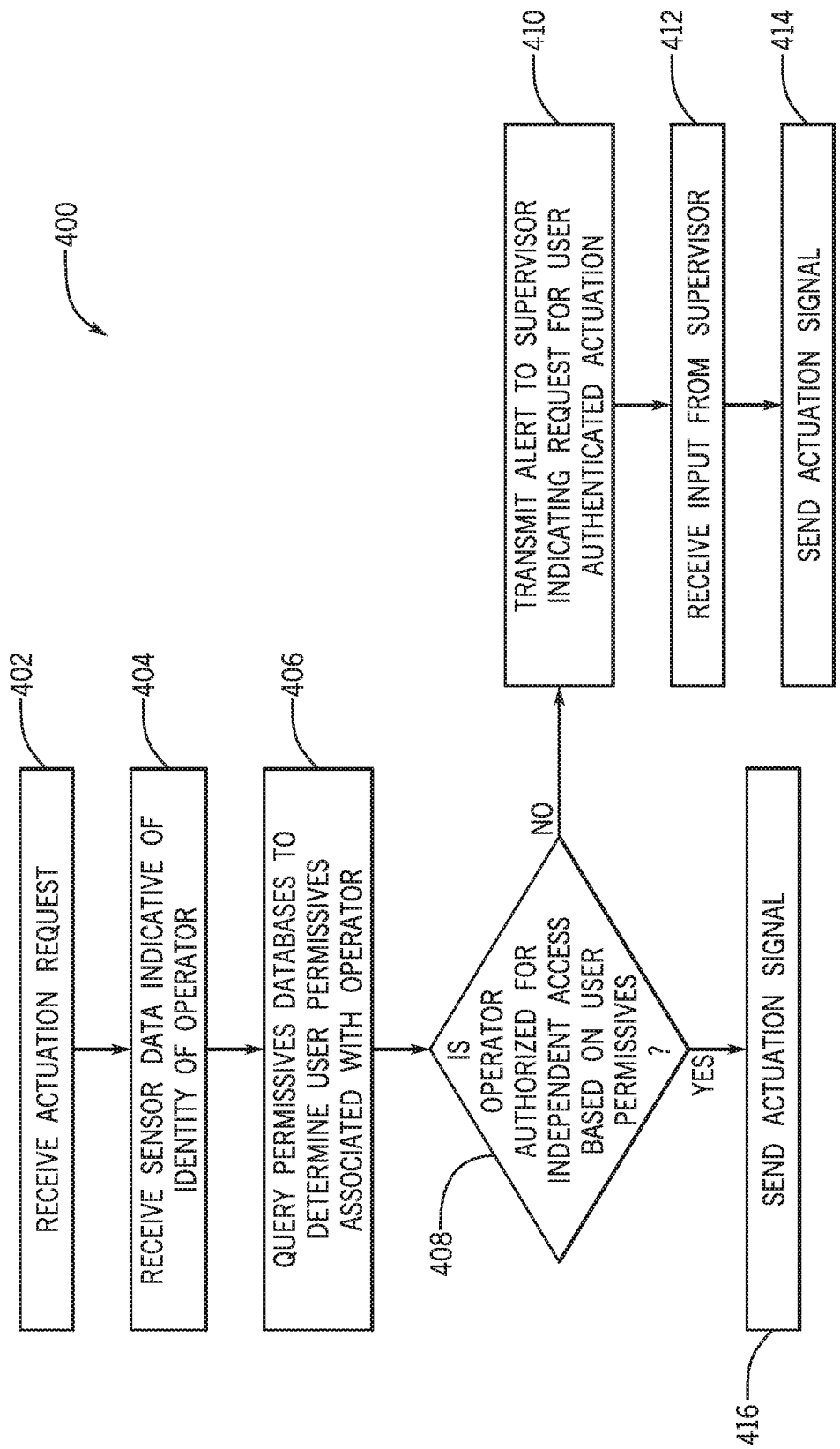
FIG. 18 is a flow diagram of a method for controlling actuation of the electronic lock of FIG. 12 based on whether the operator is authorized for independent access to an enclosure, in accordance with embodiments presented herein.

FIG. 18 is a flow diagram of a method 400 for enabling an authorized operator to monitor the operator 140 using the electronic lock 29 of FIG. 6, in accordance with embodiments presented herein. Although the following description of the method 400 is described with reference to the processor 52 of the electronic lock 29, it should be noted that the method 400 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 400 describes a number of operations that may be performed, it should be noted that the method 400 may be performed in a variety of suitable orders and all of the operations may not be performed. It should be appreciated that the method 400 may be wholly executed by the electronic lock 29 or the execution may be distributed between the electronic lock 29, the computing device 26, or other suitable devices. Moreover, although certain examples of the electronic lock 29 are described with reference to operators 140 requesting to unlock the electronic lock 29 and enter the enclosure 150, it is to be understood that a similar method to the method 400 may be performed with reference to operators 140 requesting to exit the enclosure 150 and lock the electronic lock 29.

Referring now to the method 400, the processor 52 may receive (block 402) an actuation request to lock or unlock the electronic lock 29 from an operator 140, which as discussed above with reference to block 302, may be sent from any suitable component of the industrial application 24. The processor 52 may also receive (block 404) the sensor data 204 indicative of the identity and/or location of the operator 140, such as the sensor data 204 discussed above with reference to block 304. Based on the received actuation request and/or sensor data 204, the processor 52 may query (block 406) the one or more permissives databases 170 to determine the user permissives 202 associated with the operator 140. Thus, as discussed above with reference to block 306, the user permissives 202 organized within the one or more permissives databases 170 may include the technical permissives 220 and credential permissives 222 discussed above.

Based on the user permissives 202 associated with the operator 140, the processor 52 may proceed to determine (block 408) whether the operator 140 is authorized for independent access to the industrial automation equipment 16 and/or the enclosure 150 based on the user permissives 202 associated with the operator 140. For example, the operator 140 may be authorized for independent access to the enclosure 150 based on one or more user permissives matching one or more threshold user permissives. That is, if the operator 140 is a supervising engineer, the credential permissives 222 of the operator 140 may indicate that the operator 140 is authorized for independent access to the enclosure 150. Alternatively, if the operator 140 is a technician, the credential permissives 222 of the operator 140 may indicate that the operator 140 is not authorized for independent access to the enclosure 150, and instead must be accompanied by a peer or supervisor.

In response to determining that the operator is not authorized for independent access, the processor 52 may transmit (block 410) an alert to an authorized operator or supervisor to request that the authorized user authenticates actuation of the electronic lock 29. For example, the alert may request that the authorized operator visually verify that the enclosure 150 is not occupied and/or that an appropriate set of actions has been performed before the electronic lock 29 locks. The alert may alternatively prompt the authorized user to remotely verify whether the operator 140 is to be allowed to enter the enclosure 150.

Then, the processor 52 may receive (block 412) input from the authorized operator confirming that that the appropriate set of conditions are met. For example, the authorized operator user may provide information to the processor 52 electronic lock 29 directly (i.e., through a user interface), through the computing device 26 associated with the authorized operator, and so forth. The processor 52 may therefore receive confirmation that the operator 140 requesting actuation of the electronic lock 29 has completed the appropriate set of conditions, such as leaving the enclosure 150 and/or completing a target workflow of actions to the industrial automation equipment 16 within the enclosure. Accordingly, the processor 52 may therefore send (block 414) the actuation signal to actuate the enclosure 150, as discussed above with reference to block 262. If the authorized operator does not provide input to confirm that the appropriate set of conditions are met (e.g., within a threshold amount of time after the access request or the alert provided to the authorized user), or the authorized operator provides negative input regarding the appropriate set of conditions, the processor 52 may proceed to not actuate the electronic lock 29.

Alternatively, in response to determining that the operator 140 is authorized for independent access at block 364, the processor 52 may send (block 416) the actuation signal to actuate the electronic lock 29, as also discussed above with reference to block 262. As such, the processor 52 may provide individual access to actuate the electronic lock 29 to operators 140 who have the appropriate user permissives 202.

Further technical effects of the embodiments described herein include using an electronic lock 29 of an industrial application 24 that enables virtually authenticating operators or users to enter the enclosure 150, exit and lock the enclosure 150, and/or access industrial automation equipment 16 from a connected device, such as the computing device 26. The electronic lock 29 may implement a multi-factor authentication system 200 to confirm whether individual operators 140 or groups of operators 140 have user permissives 202 or individual authorizations that correspond to an expected set of user permissives 202 for actuating the electronic lock 29. The user permissives 202 may include permissives 220 that describe the technical access for each operator 140 and credential permissives 222 that describe the credential access for each operator 140. Based on the user permissives 202 of the operator 140 requesting actuation, the electronic lock 29 may perform any suitable control action, such as actuating when the user permissives 202 indicate that the operator 140 is allowed to enter the enclosure 150 at the current time, for the current operating condition 206 of the industrial automation equipment, with an accompanying authorized operator, and so forth. The electronic lock 29 may alternatively block actuation requests, update operating conditions 206 of the industrial automation equipment 16, and/or send alerts in response to actuation requests from unauthorized operators 140. Although the above system and techniques are described with regard to the industrial application 24, it should be understood that the system and techniques may apply to any industry, such as pharmaceutical, oil and gas, food and beverage, and so forth.

In addition, it should be noted that each of the methods described herein may be combined or coordinated with each other to provide a corresponding scheme to enable access. Moreover, by enabling the techniques described herein, the conditions for accessing or actuating the electronic lock 29 may change dynamically with respect to time, operating parameters of the industrial automation equipment 16, and the like. Further, although discussed with reference to the operators 140 being technicians or employees, it is to be understood that the present techniques may be extended to authenticate any users within the industrial application 24. Additionally, although the electronic lock 29 is described with reference to locking by moving physical components such as the adjustable cable, any suitable electronic lock or locking device may additionally or alternatively be employed within the multi-factor authentication system 200, including electromagnetic locks. It should also be noted that components of the electronic lock 29 and/or the enclosure 150 may be disposed in any suitable position within the industrial application 24. For example, the camera 66, the lock display 57, and so forth of the electronic lock 29 may be disposed on the access door 156, on the wall 158, or in any other suitable position associated with an access point into the enclosure 150.

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A non-transitory computer readable medium comprising computer-executable instructions that, when executed by a processor, are configured to cause the processor to:
receive a set of user data associated with a user that is attempting to access an electronic lock;
receive a request to actuate a locking mechanism of the electronic lock configured to prevent the user from accessing a machine in an industrial automation system;
access a database comprising a plurality of user permissives, wherein each user permissive of the plurality of user permissives corresponds to one or more conditions associated with allowing an individual to actuate the locking mechanism;
determine whether the user is authorized to actuate the locking mechanism based on the set of user data and the plurality of user permissives;
send a second request to a computing device associated with another user in response to the user being unauthorized to actuate the locking mechanism, wherein the computing device is configured to receive a confirmation from the other user indicative of the user being authorized to actuate the locking mechanism in response to receiving the second request; and actuate the locking mechanism in response to receiving the confirmation from the computing device.

2. The non-transitory computer readable medium of claim 1, wherein the set of user data is indicative of the user having permission to independently access the machine.

3. The non-transitory computer readable medium of claim 1, wherein the set of user data comprises sensor data acquired by one or more sensors, wherein the sensor data is indicative of an identity or location of the user.

4. The non-transitory computer readable medium of claim 1, wherein the request comprises a notification to visually verify that an enclosure associated with the locking mechanism is not occupied.

5. The non-transitory computer readable medium of claim 1, wherein the request comprises a notification to visually verify that a set of actions associated with actuating the locking mechanism has been performed.

6. The non-transitory computer readable medium of claim 1, wherein the one or more conditions is associated with one or more technical conditions, one or more credential conditions, or any combination thereof.

7. The non-transitory computer readable medium of claim 6, wherein the one or more technical conditions comprise one or more operating conditions of the machine, a list of one or more types of machines, one or more enclosures configured to isolate the machine, or any combination thereof.

8. The non-transitory computer readable medium of claim 6, wherein the one or more credential conditions comprises one or more skill levels, one or more job titles, one or more job functions, a current employment status, a first set of indications of one or more trainings or certifications completed by the user, a second set of indications of whether the one or more trainings or certifications correspond to an expected number of trainings or certifications to be completed by the user, or any combination thereof.

9. The non-transitory computer readable medium of claim 1, wherein the instructions, when executed by the processor, are configured to cause the processor to actuate the locking mechanism by sending a command configured to cause the machine to adjust an operation of the machine in response to the user being unauthorized to actuate the locking mechanism.

10. A system, comprising:
an electronic lock comprising:
a first processor configured to receive a request to actuate the electronic lock from a user; and
a locking mechanism of the electronic lock configured to physically actuate the electronic lock; and
a cloud-based computing system comprising a second processor configured to:
receive the request from the first processor;
receive a user dataset associated with the user via one or more sensors disposed on the electronic lock;
access a database comprising a plurality of user permissives, wherein each user permissive of the plurality of user permissives corresponds to one or more conditions associated with allowing an individual to actuate the electronic lock;
determine whether the user is authorized to access equipment secured by the electronic lock based on a respective user permissive of the plurality of user permissives;
send a second request to a computing device associated with another user in response to the user being unauthorized to actuate the locking mechanism, wherein the computing device is configured to receive a confirmation from the other user indicative of the user being authorized to actuate the locking mechanism in response to receiving the second request; and
send an actuation signal to the electronic lock in response to receiving the confirmation from the computing device, wherein the actuation signal is configured to actuate the locking mechanism for the user.

11. The system of claim 10, wherein the locking mechanism comprises a power source configured to supply current to a magnet to attract or repel an adjustable feature to lock or unlock the locking mechanism.

12. The system of claim 10, wherein the one or more conditions is associated with one or more technical conditions, one or more credential conditions, or any combination thereof.

13. The system of claim 12, wherein the one or more technical conditions comprise one or more operating conditions of a machine protected by the electronic lock, a list of one or more types of machines, one or more enclosures configured to isolate the machine, or any combination thereof.

14. The system of claim 12, wherein the one or more credential conditions comprises one or more skill levels, one or more job titles, one or more job functions, one or more indications of one or more trainings completed by each user of a plurality of users, or any combination thereof.

15. The system of claim 10, wherein the second processor is configured to send a command to the equipment in response to the user being unauthorized to access the equipment, wherein the command is configured to adjust an operation of the equipment.

16. An electronic lock configured to selectively enable one or more users to access a machine in an industrial automation system, comprising:
a locking mechanism; and a processor configured to:
receive a current actuation request from a user to actuate the locking mechanism; and
actuate the locking mechanism in response to:
determining that the current actuation request corresponds to one or more expected actuation requests for the locking mechanism;
determining whether the user is authorized to access the machine secured by the electronic lock based on whether the current actuation request is associated with a plurality of conditions that correspond to a user permissive indicative of when the user can actuate the locking mechanism;
sending a request to a computing device associated with another user in response to the user being unauthorized to actuate the locking mechanism, wherein the computing device is configured to receive a confirmation from the other user indicative of the user being authorized to actuate the locking mechanism in response to receiving the request; and
sending an actuation signal to the electronic lock in response to receiving the confirmation from the computing device.

17. The electronic lock of claim 16, wherein the processor is configured to adjust an operation of the machine secured by the locking mechanism in response to determining that the current actuation request is not associated with the plurality of conditions that correspond to the user permissive.

18. The electronic lock of claim 16, wherein the processor is configured to deny the current actuation request in response to determining that the current actuation request does not correspond to the one or more expected actuation requests for the user.

19. The electronic lock of claim 16, wherein the plurality of conditions indicates that the machine is operating at a first operating mode, and wherein the processor is configured deny the current actuation request when the current actuation request is made while the machine is operating at a second operating mode that is different than the first operating mode.

20. The electronic lock of claim 19, wherein the processor is configured to instruct the machine to adjust the second operating mode to the first operating mode in response to determining that the machine is operating at the second operating mode.

* * * * *